(12) United States Patent
Ootake et al.

(10) Patent No.: US 7,939,617 B2
(45) Date of Patent: May 10, 2011

(54) POLYSILOXANE COMPOUND AND METHOD OF PRODUCING THE SAME

(75) Inventors: Nobumasa Ootake, Chiba (JP); Kazuhiro Yoshida, Chiba (JP); Kenichi Watanabe, Tokyo (JP); Yasuhito Yamaryo, Chiba (JP)

(73) Assignee: Chisso Corporation, Osaka (JP)

( * ) Notice: Subject to any disclaimer, the term of this patent is extended or adjusted under 35 U.S.C. 154(b) by 586 days.

(21) Appl. No.: 12/000,615

(22) Filed: Dec. 14, 2007

(65) Prior Publication Data

US 2008/0171846 A1   Jul. 17, 2008

(30) Foreign Application Priority Data

Dec. 15, 2006   (JP) ................. 2006-339095

(51) Int. Cl.
 *C08G 77/16* (2006.01)
 *C08G 77/18* (2006.01)
(52) U.S. Cl. .......................... 528/34; 528/37
(58) Field of Classification Search ............. 528/34, 528/37
 See application file for complete search history.

(56) References Cited

U.S. PATENT DOCUMENTS

| | | | |
|---|---|---|---|
| 5,412,053 A | 5/1995 | Lichtenhan et al. | |
| 5,589,562 A | 12/1996 | Lichtenhan et al. | |
| 7,169,873 B2 * | 1/2007 | Morimoto et al. | 528/37 |
| 7,423,107 B2 * | 9/2008 | Ootake et al. | 528/31 |
| 2006/0155091 A1 | 7/2006 | Ootake et al. | |

FOREIGN PATENT DOCUMENTS

| | | | |
|---|---|---|---|
| JP | 2006-22207 | | 1/2006 |
| WO | 03 024870 | * | 3/2003 |
| WO | 2004 081085 | * | 9/2004 |
| WO | 2005/000857 | | 1/2005 |

OTHER PUBLICATIONS

Joseph D. Lichtenhan, "Polyhedral Oligomeric Silsesquioxanes: Building Blocks for Silsesquioxane-Based Polymers and Hybrid Materials", Comments Inorg. Chem., vol. 17, No. 2, pp. 115-130, 1995.

Joseph D. Lichtenhan et al., "Silsesquioxane-Siloxane Copolymers from Polyhedral Silsesquioxanes", Macromolecules, vol. 26, pp. 2141-2142, 1993.

Stanley E. Anderson et al., "Structural Characterization of POSS Siloxane Dimer and Trimer", Chem. Mater., vol. 18, pp. 1490-1497, 2006.

* cited by examiner

Primary Examiner — Kuo-Liang Peng
(74) Attorney, Agent, or Firm — Wenderoth, Lind & Ponack, L.L.P.

(57) ABSTRACT

A polysiloxane represented by the formula (1) or (2):

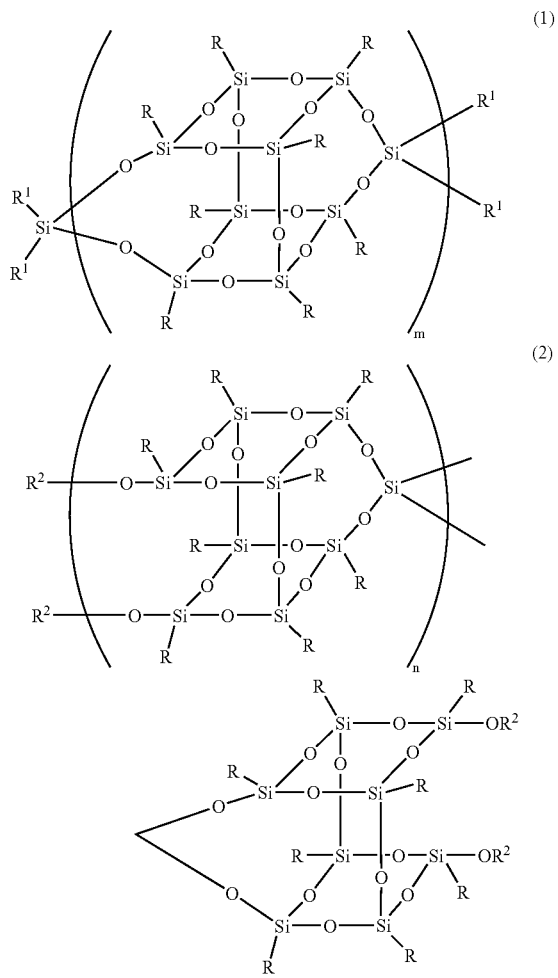

where R, $R^1$, $R^2$, m and n are defined in the specification.

18 Claims, No Drawings

POLYSILOXANE COMPOUND AND METHOD OF PRODUCING THE SAME

TECHNICAL FIELD

The present invention relates to a polysiloxane obtained by using a silsesquioxane derivative and a method of producing the polysiloxane. The polysiloxane is expected to be applied in various fields including electronic material, optical material, optoelectronic material, paint, and primer.

Here, the term "silsesquioxane" is a generic name for compounds in which each silicon atom is bound to three oxygen atoms, and each oxygen atom is bound to another silicon atom. The term "silsesquioxane skeleton" to be used in the present invention is a generic name for a silsesquioxane structure and a silsesquioxane-like structure obtained by deforming part of the silsesquioxane structure.

BACKGROUND ART

Studies have been conducted on the application of a polymer containing a silsesquioxane skeleton to various fields because the polymer has a specific skeleton structure. A polymer having a silsesquioxane skeleton structure has been heretofore synthesized by a sol-gel method involving the use of alkoxysilane such as triethoxysilane. However, the sol-gel method involves a large number of problems, for example, the method requires a long reaction time, makes it difficult to control a reaction, and is apt to leave fine holes.

Further, in recent years, a polymer using silsesquioxane having a cage-type structure or a derivative thereof has been studied, and the polymer is expected to have excellent weatherability, heat resistance, physical properties, and optical properties. For example, Lichtenhan et al. have disclosed a method of producing a copolymer obtained by polymerizing a silsesquioxane having a cage-type structure containing a defect, that is, a so-called incomplete cage-type structure (a structure which is not of a complete octahedral shape and part of which is lost) with siloxane (U.S. Pat. Nos. 5,412,053 and 5,589,562). The production method involves crosslinking the polyhedral oligomeric silsesquioxane by using a bifunctional silane, siloxane, or organometallic compound having amine etc. as a functional group. Lichtenhan et al. have also disclosed a method of producing a copolymer having, as its main chain, silsesquioxane of an incomplete cage-type structure bound with siloxane etc. and a method of producing a copolymer using silsesquioxane of a cage-type structure as a pendant copolymer component and methacrylic acid as a copolymer main chain component (Comments Inorg. Chem., 1995, 17 115-130). Further, Lichtenhan et al also disclose a method of producing a silsesquioxane-siloxane copolymer by reacting —OH which is bound to Si at a corner of the incomplete cage-type silsesquioxane with, for example, bis(dimethylamino)silane (Macromolecules, 1993, 26 2141-2142). Anderson et al. have obtained a silsesquioxane oligomer by: lithiating a silsesquioxane having silanol with n-butyllithium; and reacting the resultant with a silsesquioxane having Si—Cl at one site in a perfect cage-type structure (Chem. Matter., 2006, 18(6) 1490-1497).

The inventors of the present invention have reported that a polysiloxane can be obtained from an organic silicon compound containing silanol and referred to as a double-decker structure alone or by reacting the compound with silane or siloxane having Si—Cl (WO 2005/000857). Further, the inventors have reported that a linear polymer having a perfect cage-type structure on its main chain can be obtained by reacting a silsesquioxane having two silanols at positions symmetric with respect to each other with a siloxane having Si—Cl (JP 2006-22207). These documents discloses a method of obtaining a polymer of a silsesquioxane, but these documents describe neither a compound corresponding to a polysiloxane containing a reactive group at a terminal of its polymer main chain to be provided by the present specification nor a method of producing the compound.

DISCLOSURE OF THE INVENTION

Further improvements in heat resistance, electrical insulating property, durability, and moldability etc. have been particularly demanded in electrical and electronic materials. However, conventional silsesquioxane copolymers are not sufficient to satisfy the demands for these characteristics. In view of the foregoing, a compound having a cage-type silsesquioxane structure as its main chain and having clearly determined binding position, which is excellent in heat resistance, electrical insulating property, weatherability, hardness, mechanical strength, and chemical resistance, etc., has been demanded.

The inventors of the present invention have found that a polysiloxane represented by the following formula (1) or (2) can be synthesized by reacting a silsesquioxane represented by the formula (1-0-1) with silane represented by the formula (1-0-2) at an appropriate ratio. Further, the inventors have found that a polysiloxane containing a reactive group at a terminal of its main chain can be obtained by performing the reaction with, for example, a reactive chlorosilane. Thus, the inventors have completed the present invention.

That is, the above-mentioned problems are solved by the present invention composed of the following constitution.

[1] A polysiloxane represented by the formula (1) or (2):

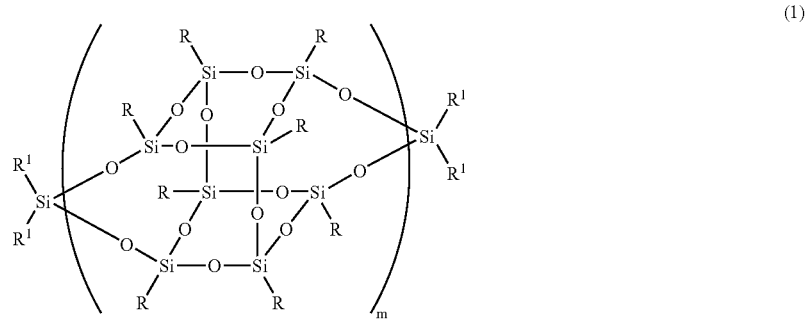

(1)

-continued

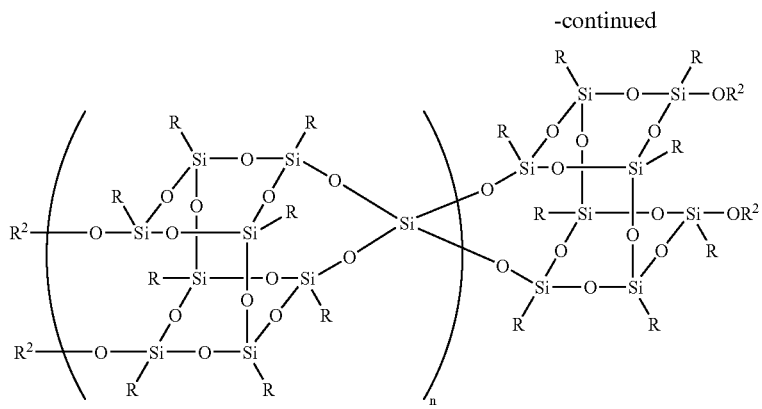

(2)

In the formula (1) and (2):

R independently represents alkyl having 1 to 45 carbon atoms whereby optional hydrogen may be replaced by fluorine and optional —$CH_2$— may be replaced by —O—, —CH=CH—, or cycloalkylene;

cycloalkyl having 4 to 8 carbon atoms;

substituted or unsubstituted aryl whereby optional hydrogen on benzene ring may be replaced by halogen or alkyl having 1 to 10 carbon atoms in which optional hydrogen may be replaced by fluorine and optional —$CH_2$— may be replaced by —O—, —CH=CH—, or phenylene; or substituted or unsubstituted arylalkyl whereby optional hydrogen on benzene ring may be replaced by halogen or alkyl having 1 to 10 carbon atoms in which optional hydrogen may be replaced by fluorine, and optional —$CH_2$— may be replaced by —O—, —CH=CH—, or phenylene, and alkylene of the arylalkyl has 1 to 10 carbon atoms whereby optional hydrogen may be replaced by fluorine and optional —$CH_2$— may be replaced by —O—, —CH=CH—, or phenylene;

m and n independently represent an integer of 1 to 1,000;

wherein when m=1, $R^1$ is independently selected from the group consisting of hydroxyl, alkoxy, acetoxy, and —OSi$(A)_3$, and when $2 \leq m \leq 1,000$, $R^1$ is independently selected from the group consisting of hydrogen, hydroxyl, halogen, alkoxy, acetoxy, —OSi$(A)_3$, and a group defined in the same manner as R;

in —OSi$(A)_3$, A independently represents hydrogen;

alkyl having 1 to 10 carbon atoms whereby optional hydrogen may be replaced by hydroxyl, halogen, carboxyl, ester, 2,4-dioxo-3-oxacyclopentyl, acetoxy, amino group, isocyanate, oxiranyl, 3,4-epoxycyclohexyl, oxetanyl, cyano, vinyl, (meth)acryloyl, 4-vinylphenyl, alkyleneoxy, or mercapto, and optional —$CH_2$— may be replaced by —O—, —CH=CH— or phenylene; or phenyl; and $R^2$ independently represents hydrogen or —Si$(A)_3$ whereby A represents a group defined in the same manner as A in $R^1$.

[2] A polysiloxane represented by the formula (1-0) or (2-0):

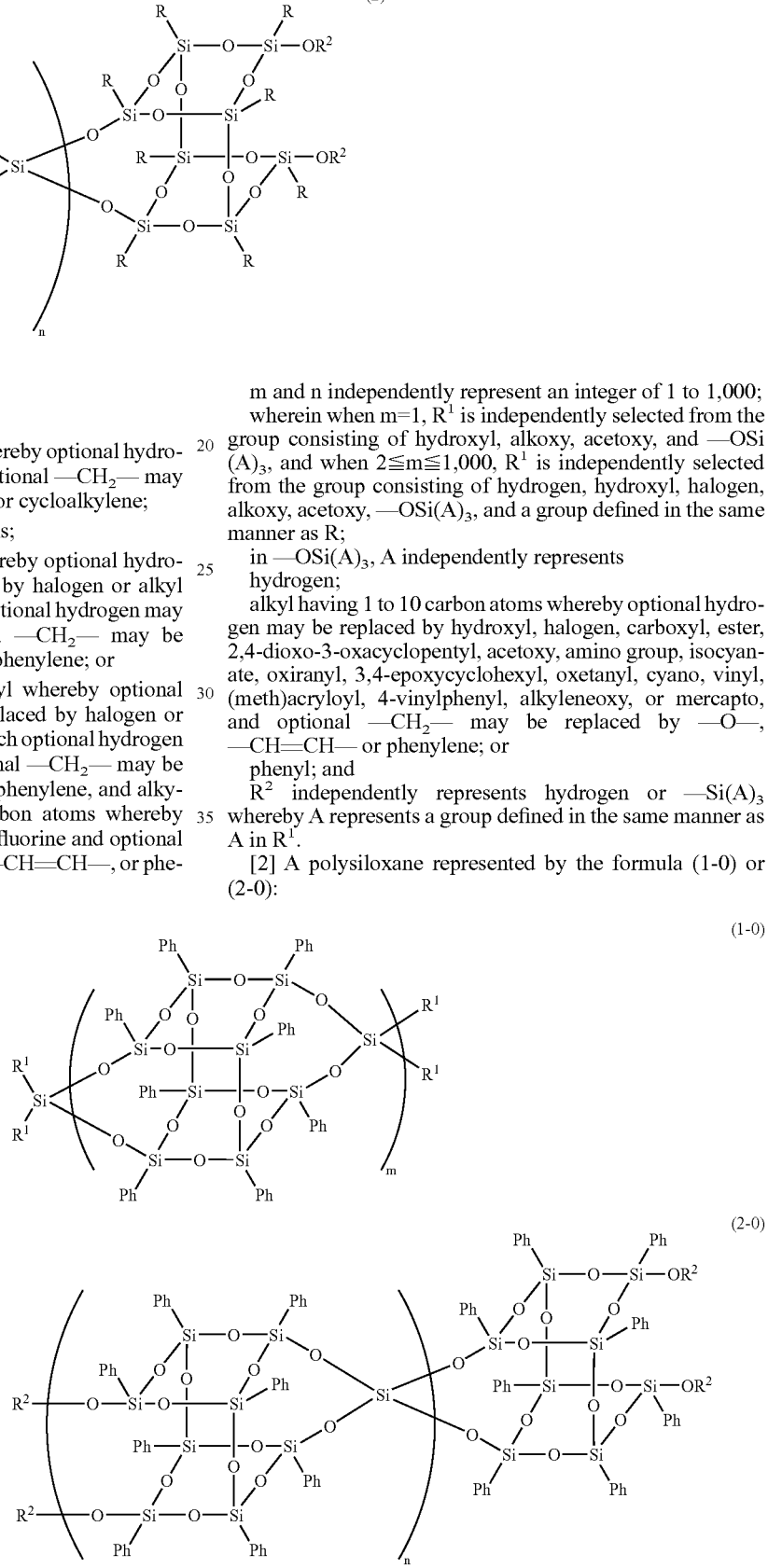

In the formula (1-0) and (2-0):
when m=1, $R^1$ is independently selected from the group consisting of hydroxyl, alkoxy, acetoxy, and —OSi(A)$_3$, and when $2 \leq m \leq 1,000$, $R^1$ is independently selected from the group consisting of hydrogen, hydroxyl, halogen, alkoxy, acetoxy, —OSi(A)$_3$, alkyl having 1 to 10 carbon atoms, and phenyl;

in —OSi(A)$_3$, A independently represents
hydrogen;
alkyl having 1 to 10 carbon atoms whereby optional hydrogen may be replaced by hydroxyl, halogen, carboxyl, ester, 2,4-dioxo-3-oxacyclopentyl, acetoxy, amino group, isocyanate, oxiranyl, 3,4-epoxycyclohexyl, oxetanyl, cyano, vinyl, (meth)acryloyl, 4-vinylphenyl, alkyleneoxy, or mercapto, and optional —CH$_2$— may be replaced by phenylene, —O—, —CH=CH— or phenylene; or
phenyl; and
$R^2$ independently represents hydrogen or —Si(A)$_3$ whereby A represents a group defined in the same manner as A in $R^1$.

[3] A polysiloxane represented by the formula (1-1):

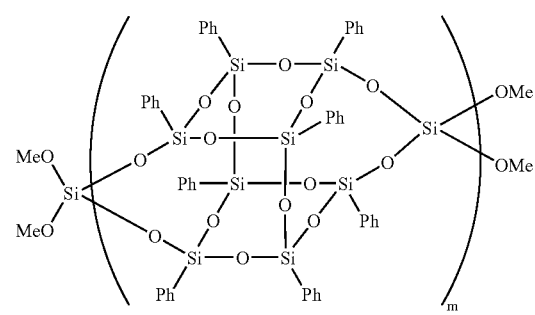

(1-1)

In the formula (1-1), m represents an integer of 1 to 1,000.

[4] A polysiloxane represented by the formula (1-2):

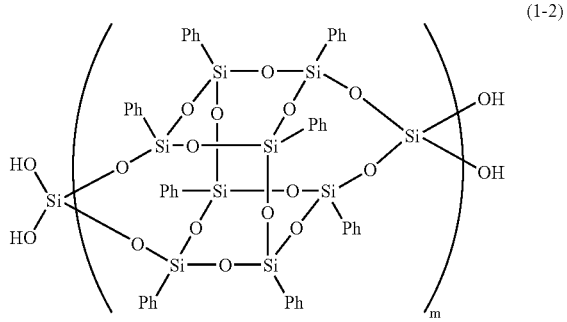

(1-2)

In the formula (1-2), m represents an integer of 1 to 1,000.

[5] A polysiloxane represented by the formula (1-3):

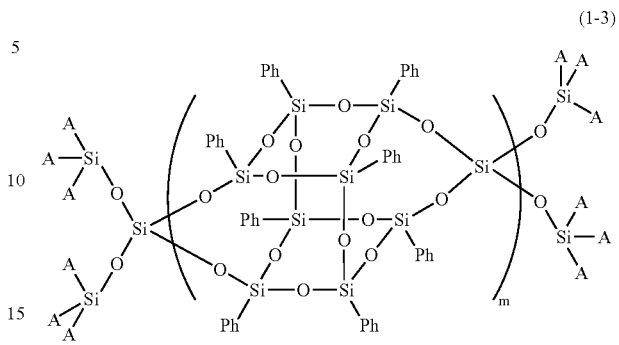

(1-3)

In the formula (1-3), A independently represents
hydrogen;
alkyl having 1 to 10 carbon atoms whereby optional hydrogen may be replaced by hydroxyl, halogen, carboxyl, ester, 2,4-dioxo-3-oxacyclopentyl, acetoxy, amino group, isocyanate, oxiranyl, 3,4-epoxycyclohexyl, an oxetanyl, cyano, vinyl, (meth)acryloyl, 4-vinylphenyl, alkyleneoxy, or mercapto, and optional —CH$_2$— may be replaced by —O—, —CH=CH— or phenylene; or
phenyl; and
m represents an integer of 1 to 1,000.

[6] A polysiloxane represented by the formula (1-4):

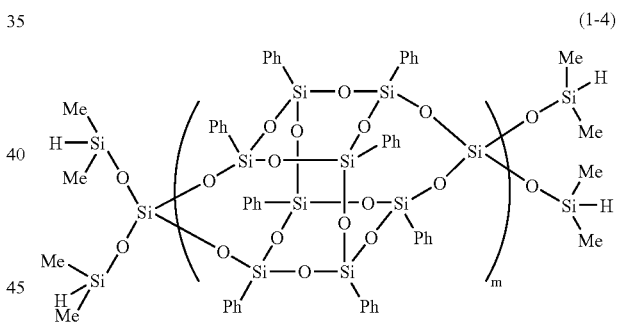

(1-4)

In the formula (1-4), m represents an integer of 1 to 1,000.

[7] A polysiloxane represented by the formula (1-5):

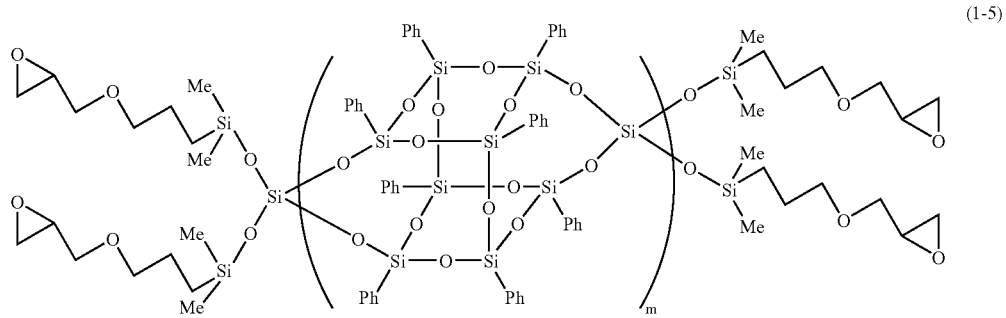

(1-5)

In the formula (1-5), m represents an integer of 2 to 1,000.

[8] A polysiloxane represented by the formula (1-6):
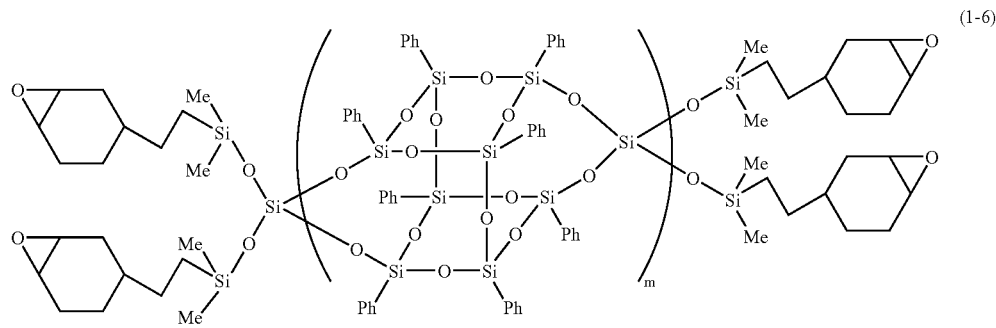
In the formula (1-6), m represents an integer of 1 to 1,000.
[9] A polysiloxane represented by the formula (2-1):
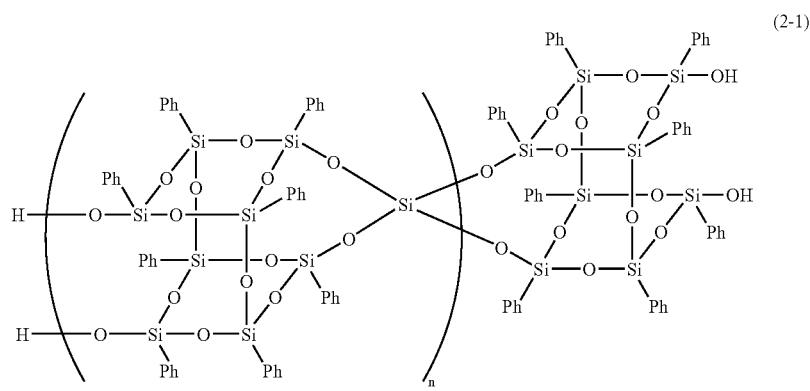
In the formula (2-1), n represents an integer of 1 to 1,000.
[10] A polysiloxane represented by the formula (2-2):
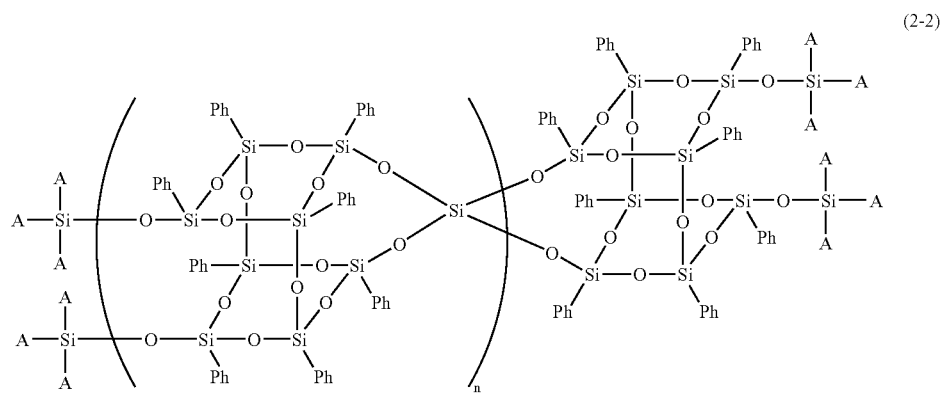

In the formula (2-2), n represents an integer of 1 to 1,000, and

A independently represents hydrogen;

alkyl having 1 to 10 carbon atoms whereby optional hydrogen may be replaced by hydroxyl, halogen, carboxyl, ester 2,4-dioxo-3-oxacyclopentyl, acetoxy, amino group, isocyanate, oxiranyl, 3,4-epoxycyclohexyl, oxetanyl, cyano, vinyl, (meth)acryloyl, 4-vinylphenyl, alkyleneoxy, or mercapto, and optional —$CH_2$— may be replaced by —O—, —CH=CH— or phenylene;

phenyl.

[11] A method of producing a polysiloxane represented by the formula (1-a) or (2-a), comprising reacting a compound represented by the formula (1-0-1) with a compound represented by the formula (1-0-2):

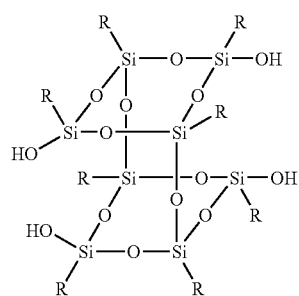

(1-0-1)

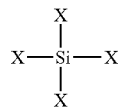

(1-0-2)

In the formula (1-0-1),

R independently represents alkyl having 1 to 45 carbon atoms whereby optional hydrogen may be replaced by fluorine, and optional —$CH_2$— may be replaced by —O— or —CH=CH—;

cycloalkyl having 4 to 8 carbon atoms;

substituted or unsubstituted aryl whereby optional hydrogen on benzene ring may be replaced by halogen or alkyl having 1 to 10 carbon atoms in which optional hydrogen may be replaced by fluorine, and optional —$CH_2$— may be replaced by —O— or —CH=CH—; or substituted or unsubstituted arylalkyl whereby optional hydrogen on benzene ring may be replaced by halogen or alkyl having 1 to 10 carbon atoms in which optional hydrogen may be replaced by fluorine, and optional —$CH_2$— may be replaced by —O— or —CH=CH—, and alkylene of the arylalkyl has 1 to 10 carbon atoms, and optional —$CH_2$— in the alkylene may be replaced by —O—; and In the formula (1-0-2), X represents a group capable of reacting with silanol;

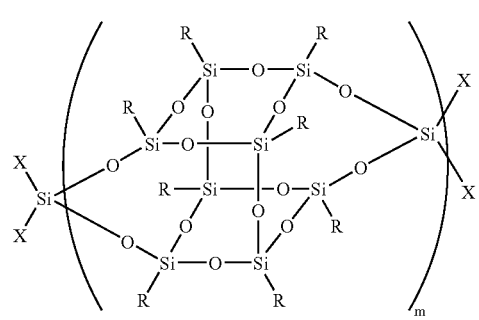

(1-a)

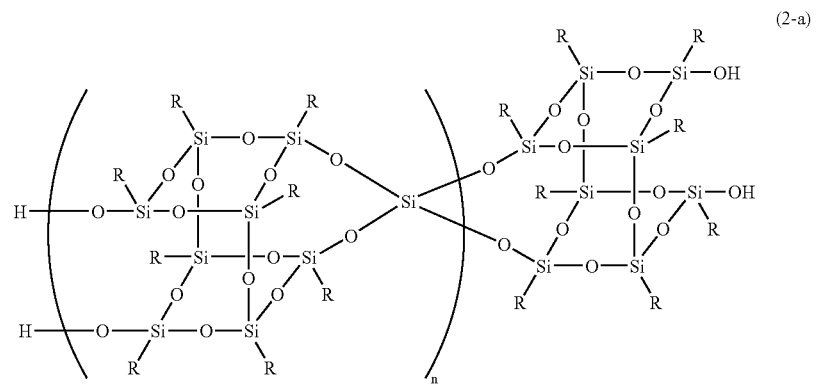

(2-a)

In the formula (1-a) and (2-a),
R represents a group defined in the same manner as R in the formula (1-0-1);
X represent a group defined in the same manner as X in the formula (1-0-2); and
m and n represent an integer of 1 to 1,000.

[12] A method of producing a polysiloxane represented by the formula (1-a) or (2-a), comprising reacting a compound represented by the formula (1-0-1') with a compound represented by the formula (1-0-2'):

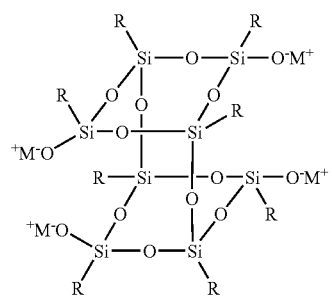
(1-0-1')

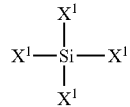
(1-0-2')

In the formula (1-0-1') and (1-0-2')
M is alkali metal, and R independently represents
alkyl having 1 to 45 carbon atoms whereby optional hydrogen may be replaced by fluorine, and optional —$CH_2$— may be replaced by —O— or —CH=CH—;
cycloalkyl having 4 to 8 carbon atoms;
substituted or unsubstituted aryl whereby optional hydrogen on benzene ring may be replaced by halogen or alkyl having 1 to 10 carbon atoms in which optional hydrogen may be replaced by fluorine, and optional —$CH_2$— may be replaced by —O— or —CH=CH—; or
substituted or unsubstituted arylalkyl whereby optional hydrogen on benzene ring may be replaced by halogen or alkyl having 1 to 10 carbon atoms in which optional hydrogen may be replaced by fluorine, and optional —$CH_2$— may be replaced by —O— or —CH=CH—, and alkylene of the arylalkyl has 1 to 10 carbon atoms, and optional —$CH_2$— in the alkylene may be replaced by —O—; and
$X^1$ represents halogen;

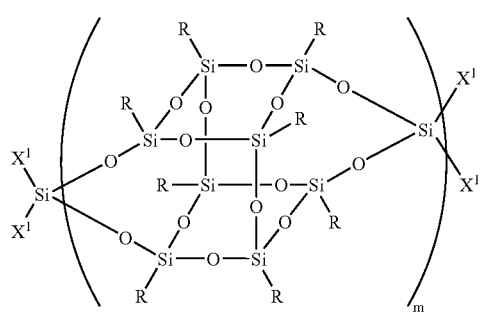
(1-a')

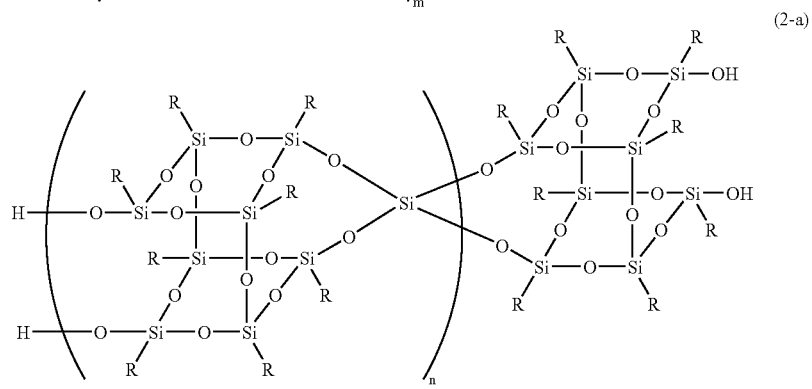
(2-a)

In the formula (1-a) and (2-a),
R represents a group defined in the same manner as R in the formula (1-0-1');
$X^1$ represents a group defined in the same manner as $X^1$ in the formula (1-0-2'); and
m and n represent an integer of 1 to 1,000.

[13] A method of producing a compound represented by the formula (1-b), comprising producing a compound represented by the formula (1-a) by the method according to [11], and hydrolyzing the resultant compound represented by the formula (1-a):

(1-b)

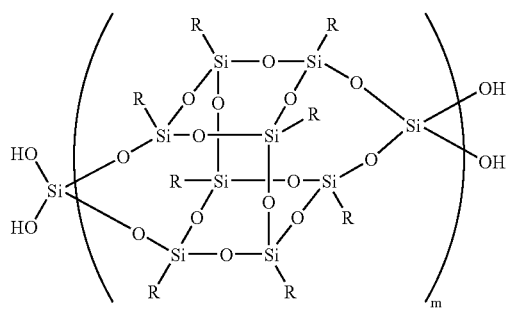

In the formula (1-b),

R represents a group defined in the same manner as in the formula (1-a); and m represents an integer of 1 to 1,000.

[14] A method of producing a compound represented by the formula (1-b), comprising producing a compound represented by the formula (1-a') by the method according to [12], and hydrolyzing the compound represented by the formula (1-a'):

(1-b)

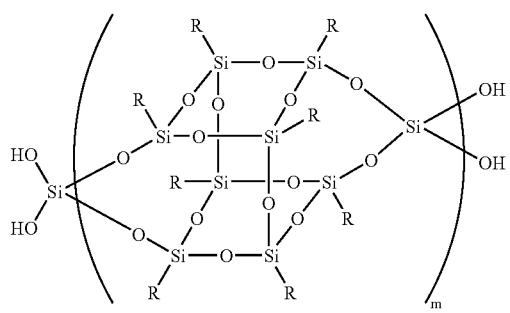

In the formula (1-b),

R represents a group defined in the same manner as R in the formula (1-a'); and m represents an integer of 1 to 1,000.

[15] A method of producing a compound represented by the formula (1-c), comprising producing a compound represented by the formula (1-b) by the method according to [13] or [14], and reacting the compound represented by the formula (1-b) with a compound represented by the formula (1-0-3):

(1-0-3)

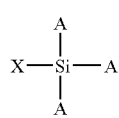

(1-c)

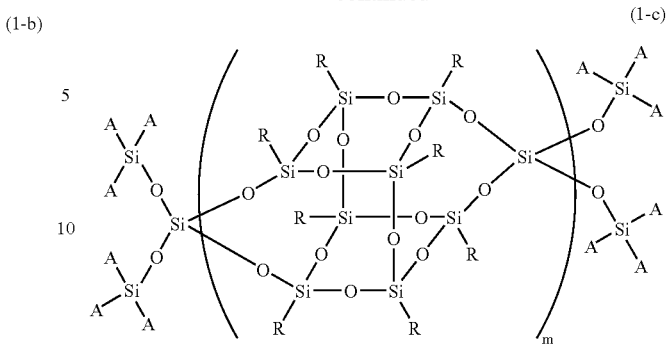

In the formula (1-0-3) and (1-c),

R represents a group defined in the same manner as R in the formula (1-b);

m represents an integer of 1 to 1,000;

X represents a group capable of reacting with silanol;

A independently represents hydrogen;

alkyl having 1 to 10 carbon atoms whereby optional hydrogen may be replaced by hydroxyl, halogen, carboxyl, ester, 2,4-dioxo-3-oxa-cyclopentyl, acetoxy, amino group, isocyanate, oxiranyl, 3,4-epoxycyclohexyl, oxetanyl, cyano, vinyl, (meth)acryloyl, 4-vinylphenyl, alkyleneoxy, or mercapto, and optional —$CH_2$— may be replaced by —O—, —CH=CH— or phenylene; or phenyl.

[16] A method of producing a compound represented by the formula (1-c), comprising producing a compound represented by the formula (1-a) by the method according to [11], and reacting the compound represented by the formula (1-a) with a compound represented by the formula (1-0-4):

(1-0-4)

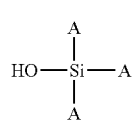

(1-c)

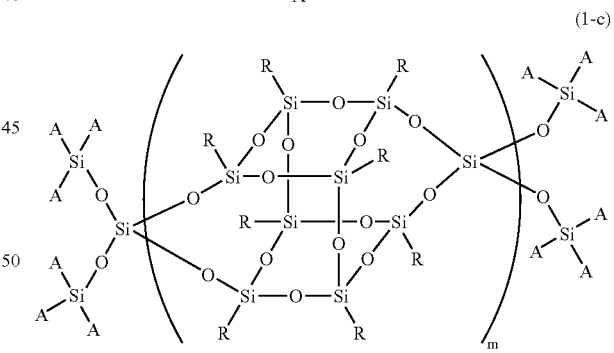

In the formula (1-0-4) and (1-c),

R represents a group defined in the same manner as R in the formula (1-a);

m represents an integer of 1 to 1,000;

A independently represents hydrogen;

alkyl having 1 to 10 carbon atoms whereby optional hydrogen may be replaced by hydroxyl, halogen, carboxyl, ester, 2,4-dioxo-3-oxa-cyclopentyl, acetoxy, amino group, isocyanate, oxiranyl, 3,4-epoxycyclohexyl, oxetanyl, cyano, vinyl, (meth)acryloyl, 4-vinylphenyl, alkyleneoxy, or mercapto, and optional —$CH_2$— may be replaced by —O—, —CH=CH— or phenylene; or phenyl.

[17] A method of producing a compound represented by the formula (1-c), comprising producing a compound represented by the formula (1-a') by the method according to [12], and reacting the compound represented by the formula (1-a') with a compound represented by the formula (1-0-4):

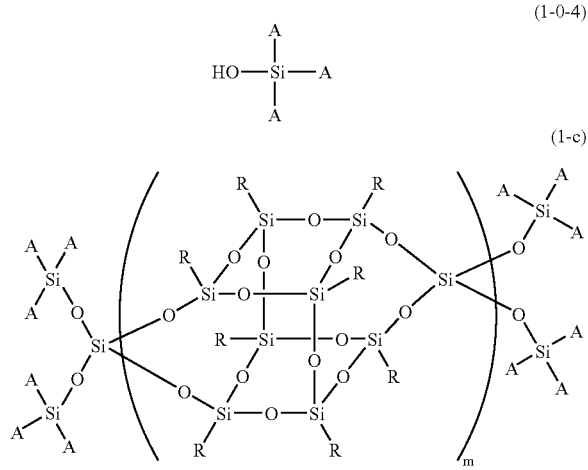

In the formula (1-0-4) and (1-c),
R represents a group defined in the same manner as R in the formula (1-a');
m represents an integer of 1 to 1,000;
A independently represents
hydrogen;
alkyl having 1 to 10 carbon atoms whereby optional hydrogen may be replaced by hydroxyl, halogen, carboxyl, ester, 2,4-dioxo-3-oxa-cyclopentyl, acetoxy, amino group, isocyanate oxiranyl, 3,4-epoxycyclohexyl, oxetanyl, cyano, vinyl, (meth)acryloyl, 4-vinylphenyl, alkyleneoxy, or mercapto, and optional —$CH_2$— may be replaced by —O—, —CH=CH— or phenylene; or
phenyl.

[18] A method of producing a compound represented by the formula (2-b), comprising producing a compound represented by the formula (2-a) by the method according to [11] or [12], and reacting the compound represented by the formula (2-a) with a compound represented by the formula (1-0-3):

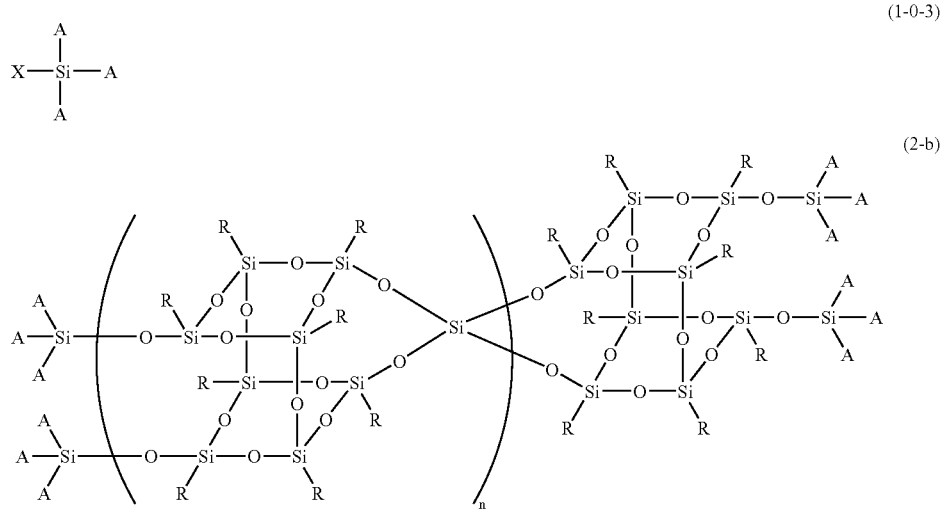

In the formula (1-0-3) and (2-b),
R represents a group defined in the same manner as R in the formula (2-a);
n represents an integer of 1 to 1,000;
X represents a group capable of reacting with silanol;
A independently represents
hydrogen;
alkyl having 1 to 10 carbon atoms whereby optional hydrogen may be replaced by hydroxyl, halogen, carboxyl, ester, 2,4-dioxo-3-oxa-cyclopentyl, acetoxy, amino group, isocyanate, oxiranyl, 3,4-epoxycyclohexyl, oxetanyl, cyano, vinyl, (meth)acryloyl, 4-vinylphenyl, alkyleneoxy, or mercapto, and optional —$CH_2$— may be replaced by —O—, —CH=CH— or phenylene; or
phenyl.

[19] A method of producing a compound represented by the formula (1-d), comprising producing a compound represented by the formula (1-c) in which at least one of A's represents hydrogen, and remaining of A's represent alkyl having 1 to 10 carbon atoms, phenyl, or phenylalkyl by the method according to any one of [15] to [17], and reacting the resultant compound with a compound represented by the formula (1-0-5):

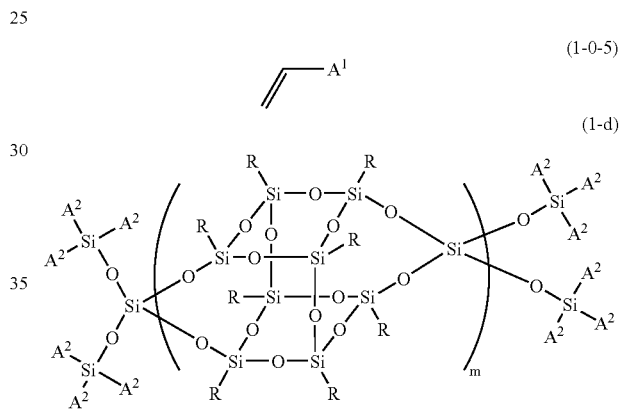

In the formula (1-0-5) and (1-d),
$A^1$ represents alkyl having 1 to 8 carbon atoms whereby optional hydrogen may be replaced by hydroxyl, halogen, carboxyl, ester, 2,4-dioxo-3-oxa-cyclopentyl, acetoxy, amino group, isocyanate, oxiranyl, 3,4-epoxycyclohexyl, oxetanyl, cyano, vinyl, (meth)acryloyl, 4-vinylphenyl, alkyleneoxy, or mercapto, and optional —CH$_2$— may be replaced by —O—, —CH=CH— or phenylene;

R represents a group defined in the same manner as R in the formula (1-c); and at least one of A$^2$'s represents —CH$_2$CH$_2$A$^1$, and remaining of A$^2$'s are independently selected from the group consisting of alkyl having 1 to 10 carbon atoms, phenyl, and phenylalkyl.

[20] A method of producing a compound represented by the formula (2-d), comprising producing a compound represented by the formula (2-b) in which at least one of A's represents hydrogen, and remaining of A's represent alkyl having 1 to 10 carbon atoms, phenyl, or phenylalkyl by the method according to [18], and reacting the resultant compound with a compound represented by the formula (1-0-5):

different from each other. For example, the case when optional —CH$_2$— in alkyl may be replaced by —O— or —CH=CH— means that the alkyl may be alkoxyalkenyl or alkenyloxyalkyl. In addition, any one of alkoxy, alkenylene, alkenyl, and alkylene in these groups may be linear or branched. However, in the present invention, adjacent —CH$_2$—, i.e., (—CH$_2$—)$_2$ are not replaced by (—O—)$_2$. In addition, the term "carbon number" denotes a number of carbon atoms in the group.

Further, in the present invention, a structure in which four oxygen is bound to Si is referred to as Q structure, a structure in which three oxygen is bound to Si is referred to as T structure, a structure in which two oxygen is bound to Si is referred to as D structure, and a structure in which one oxygen is bound to Si is referred to as M structure. Therefore, the term "T$_8$Q$_2$ structure" means a structure obtained by combining eight T structures and two Q structures.

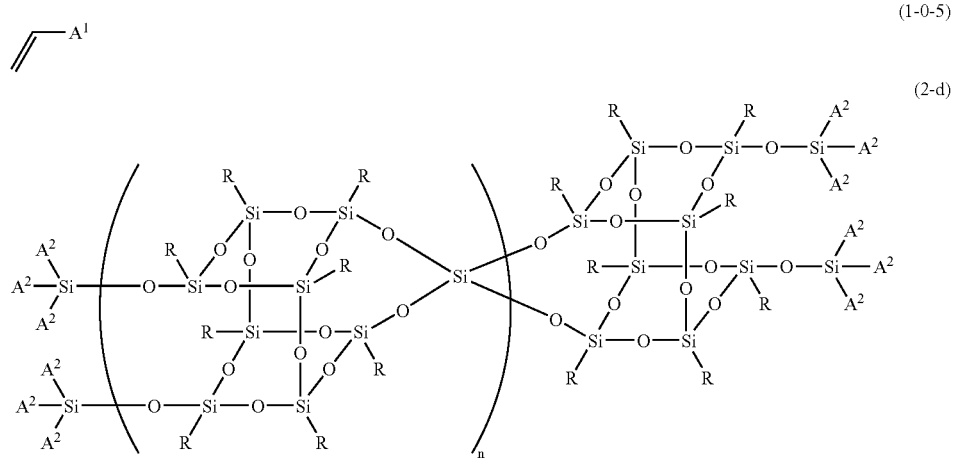

In the formula (1-0-5) and (2-d),

A$^1$ represents alkyl having 1 to 8 carbon atoms whereby optional hydrogen may be replaced by hydroxyl, halogen, carboxyl, ester, 2,4-dioxo-3-oxa-cyclopentyl, acetoxy, amino group, isocyanate, oxiranyl, 3,4-epoxycyclohexyl, oxetanyl, cyano, vinyl, (meth)acryloyl, 4-vinylphenyl, alkyleneoxy, or mercapto, and optional —CH$_2$— may be replaced by —O—, —CH=CH— or phenylene;

R represents a group defined in the same manner as R in the formula (2-b); and at least one of A$^2$'s represents —CH$_2$CH$_2$A$^1$, and remaining of A$^2$'s are independently selected from the group consisting of alkyl having 1 to 10 carbon atoms, phenyl, and phenylalkyl.

The terms as used herein are defined as follows. Each of alkyl and alkylene may be linear or branched. This holds true for the case where optional hydrogen in each of alkyl and alkylene is replaced by halogen, cyclic group, or the like, and for the case where optional —CH$_2$— in each of alkyl and alkylene is replaced by —O—, —CH=CH—, cycloalkylene, phenylene, or the like. The term "optional" as used herein means that not only a position but also a number is optional. When multiple groups are replaced by other groups, groups by which the multiple groups are replaced may be According to the present invention, a polysiloxane compound having, on its main chain, a silsesquioxane skeleton having Q(T$_8$Q)$_n$ structure or T$_8$(QT$_8$)$_n$ structure can be obtained. Further, a polysiloxane compound having, for example, M$_2$Q(T$_8$Q)$_n$M$_2$ structure, DT$_8$(QT8)$_n$D structure, or M$_2$T$_8$(QT$_8$)$_n$M$_2$ structure can be obtained by capping the resultant polysiloxane with a silicon compound containing a reactive group. Further, an organic-inorganic composite material can be produced by using the resultant polysiloxane.

DESCRIPTION OF THE PREFERABLE EMBODIMENTS

In the following description, a silicon compound represented by the formula (1) may be represented as Compound (1), and a compound represented by the formula (2) may be represented as Compound (2). A compound represented by any other formula may also be simply represented in the same manner as that described above.

Hereinafter, the present invention will be described in more detail.

A polysiloxane provided by the present invention is represented by the formula (1) or (2).

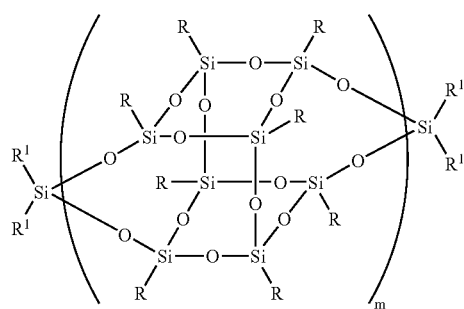

(1)

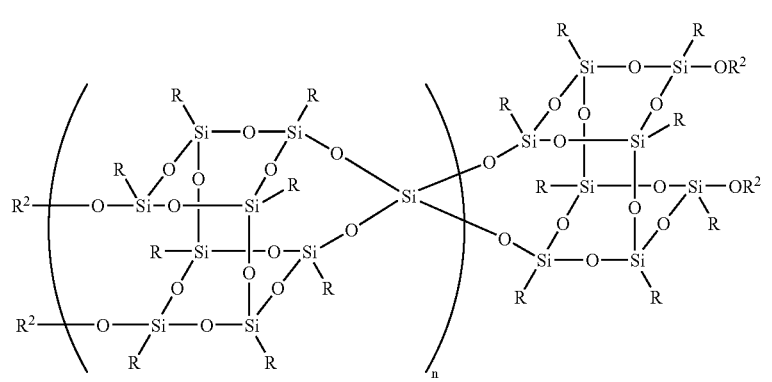

(2)

In the formula (1) and (2)

R independently represents alkyl having 1 to 45 carbon atoms, cycloalkyl having 4 to 8 carbon atoms, substituted or unsubstituted aryl, or substituted or unsubstituted arylalkyl.

The alkyl having 1 to 45 carbon atoms has preferably 1 to 30, or more preferably 1 to 8 carbon atoms. In addition, optional hydrogen in the alkyl may be replaced by fluorine, and optional —$CH_2$— in the alkyl may be replaced by —O—, —CH=CH—, or cycloalkylene.

Examples of the unsubstituted alkyl having 1 to 30 carbon atoms include methyl, ethyl, propyl, 1-methylethyl, butyl, 2-methylpropyl, 1,1-dimethylethyl, pentyl, hexyl, 1,1,2-trimethylpropyl, heptyl, octyl, 2,4,4-trimethylpentyl, nonyl, decyl, undecyl, dodecyl, tetradecyl, hexadecyl, octadecyl, eicosyl, docosyl, and triacontyl. Examples of fluorinated alkyl having 1 to 30 carbon atoms include a 3,3,3-trifluoropropyl, 3,3,4,4,5,5,6,6,6-nonadecafluorohexyl, tridecafluoro-1,1,2,2-tetrahydrooctyl, heptadecafluoro-1,1,2,2-tetrahydrodecyl, perfluoro-1H, 1H, 2H, 2H-dodecyl, and perfluoro-1H, 1H, 2H, 2H-tetradecyl.

Examples of cycloalkyl having 4 to 8 carbon atoms include cyclohexyl, cyclopentyl, 2-bicycloheptyl, and cyclooctyl.

In the case where R in the formula (1) is substituted or unsubstituted aryl, optional hydrogen may be replaced by halogen or alkyl having 1 to 10 carbon atoms. Preferable examples of halogen include fluorine, chlorine, and bromine. In the alkyl having 1 to 10 carbon atoms, optional hydrogen may be replaced by fluorine, and optional —$CH_2$— may be replaced by —O—, —CH=CH—, or phenylene. That is, preferable examples of substituted or unsubstituted aryl represented by R include phenyl, alkylphenyl, alkyloxyphenyl, alkenylphenyl, phenyl having, as a substituent, alkyl containing 1 to 10 carbon atoms in which optional —$CH_2$— is replaced by phenylene. In each of the groups listed here, optional hydrogen on benzene ring may be replaced by halogen. Note that "phenyl" in the present invention denotes unsubstituted phenyl if not specified.

Examples of halogenated phenyl include pentafluorophenyl, 4-chlorophenyl, and 4-bromophenyl. Examples of alkylphenyl include 4-methylphenyl, 4-ethylphenyl, 4-propylphenyl, 4-butylphenyl, 4-pentylphenyl, 4-heptylphenyl, 4-octylphenyl, 4-nonylphenyl, 4-decylphenyl, 2,4-dimethylphenyl, 2,4,6-trimethylphenyl, 2,4,6-triethylphenyl, 4-(1-methylethyl)phenyl, 4-(1,1-dimethylethyl)phenyl, 4-(2-ethylhexyl)phenyl, and 2,4,6-tris(1-methylethyl)phenyl. Examples of alkyloxyphenyl include 4-methoxyphenyl, 4-ethoxyphenyl, 4-propoxyphenyl, 4-butoxyphenyl, 4-pentyloxyphenyl, 4-heptyloxyphenyl, 4-decyloxyphenyl, 4-octadecyloxyphenyl, 4-(1-methylethoxy)phenyl, 4-(2-methylpropoxy)phenyl, and 4-(1,1-dimethylethoxy)phenyl. Examples of the alkenylphenyl include 4-ethenylphenyl, 4-(1-methylethenyl)phenyl, and 4-(3-butenyl)phenyl.

Examples of phenyl having, as a substituent, alkyl containing 1 to 10 carbon atoms in which optional —$CH_2$— is replaced by phenylene include 4-(2-phenylethenyl)phenyl, 4-phenyloxyphenyl, 3-phenylmethylphenyl, biphenyl, and terphenyl. 4-(2-phenylethenyl)phenyl is an example of ethylphenyl in which one —$CH_2$— is replaced by phenylene and another —$CH_2$— is replaced by —CH=CH—.

Examples of phenyl in which some of hydrogen on benzene ring is replaced by halogen and other hydrogen is replaced by alkyl, alkyloxy, or alkenyl include 3-chloro-4-methylphenyl, 2,5-dichloro-4-methylphenyl, 3,5-dichloro-4-methylphenyl, 2,3,5-trichloro-4-methylphenyl, 2,3,6-trichloro-4-methylphenyl, 3-bromo-4-methylphenyl, 2,5-dibromo-4-methylphenyl, 3,5-dibromo-4-methylphenyl, 2,3-difluoro-4-methylphenyl, 3-chloro-4-methoxyphenyl, 3-bromo-4-methoxyphenyl, 3,5-dibromo-4-methoxyphenyl, 2,3-difluoro-4-methoxyphenyl, 2,3-difluoro-4-ethyoxyphenyl, 2,3-difluoro-4-propoxyphenyl, and 4-ethenyl-2,3,5,6-tetrafluorophenyl.

When any one of R in the formula (1) represents substituted or unsubstituted arylalkyl, alkylene of the arylalkyl has 1 to 10 carbon atoms, optional hydrogen in the alkylene may be replaced by fluorine, and optional —CH$_2$— in the alkylene may be replaced by —O—, —CH=CH—, or cycloalkylene. A preferable example of the arylalkyl is phenylalkyl.

Specific examples of unsubstituted phenylalkyl include phenylmethyl, 2-phenylethyl, 3-phenylpropyl, 4-phenylbutyl, 5-phenylpentyl, 6-phenylhexyl, 11-phenylundecyl, 1-phenylethyl, 2-phenylpropyl, 1-methyl-2-phenylethyl, 1-phenylpropyl, 3-phenylbutyl, 1-methyl-3-phenylpropyl, 2-phenylbutyl, 2-methyl-2-phenylpropyl, and 1-phenylhexyl.

In the phenylalkyl, optional hydrogen on benzene ring may be replaced by halogen or alkyl having 1 to 10 carbon atoms. In the alkyl having 1 to 10 carbon atoms, optional hydrogen may be replaced by fluorine, and optional —CH$_2$— may be replaced by —O—, —CH=CH—, or phenylene.

Specific examples of phenylalkyl in which optional hydrogen on benzene ring is replaced by fluorine include 4-fluorophenylmethyl, 2,3,4,5,6-pentafluorophenylmethyl, 2-(2,3,4,5,6-pentafluorophenyl)ethyl, 3-(2,3,4,5,6-pentafluorophenyl)propyl, 2-(2-fluorophenyl)propyl, and a 2-(4-fluorophenyl)propyl.

Specific examples of phenylalkyl in which optional hydrogen on benzene ring is replaced by chlorine include 4-chlorophenylmethyl, 2-chlorophenylmethyl, 2,6-dichlorophenylmethyl, 2,4-dichlorophenylmethyl, 2,3,6-trichlorophenylmethyl, a 2,4,6-trichlorophenylmethyl, 2,4,5-trichlorophenylmethyl, a 2,3,4,6-tetrachlorophenylmethyl, 2,3,4,5,6-pentachlorophenylmethyl, 2-(2-chlorophenyl)ethyl, 2-(4-chlorophenyl)ethyl, 2-(2,4,5-chlorophenyl)ethyl, 2-(2,3,6-chlorophenyl)ethyl, 3-(3-chlorophenyl)propyl, 3-(4-chlorophenyl)propyl, 3-(2,4,5-trichlorophenyl)propyl, 3-(2,3,6-trichlorophenyl)propyl, a 4-(2-chlorophenyl)butyl, 4-(3-chlorophenyl)butyl, 4-(4-chlorophenyl)butyl, 4-(2,3,6-trichlorophenyl)butyl, 4-(2,4,5-trichlorophenyl)butyl a 1-(3-chlorophenyl)ethyl, 1-(4-chlorophenyl)ethyl, 2-(4-chlorophenyl)propyl, 2-(2-chlorophenyl)propyl, and 1-(4-chlorophenyl)butyl.

Specific examples of phenylalkyl in which optional hydrogen on benzene ring is replaced by bromine include 2-bromophenylmethyl, 4-bromophenylmethyl, 2,4-dibromophenylmethyl, 2,4,6-tribromophenylmethyl, 2,3,4,5-tetrabromophenylmethyl, 2,3,4,5,6-pentabromophenylmethyl, 2-(4-bromophenyl)ethyl, 3-(4-bromophenyl)propyl, 3-(3-bromophenyl)propyl, 4-(4-bromophenyl)butyl, 1-(4-bromophenyl)ethyl, 2-(2-bromophenyl)propyl, and 2-(4-bromophenyl)propyl.

Specific examples of phenylalkyl in which optional hydrogen on benzene ring is replaced by alkyl having 1 to 10 carbon atoms include 2-methylphenylmethyl, 3-methylphenylmethyl, 4-methylphenylmethyl, 4-dodecylphenylmethyl, (3,5-dimethylphenylmethyl, 2-(4-methylphenyl)ethyl, 2-(3-methylphenyl)ethyl, 2-(2,5-dimethylphenyl)ethyl, 2-(4-ethylphenyl)ethyl, 2-(3-ethylphenyl)ethyl, 1-(4-methylphenyl)ethyl, 1-(3-methylphenyl)ethyl, 1-(2-methylphenyl)ethyl, 2-(4-methylphenyl)propyl, 2-(2-methylphenyl)propyl, 2-(4-ethylphenyl)propyl, 2-(2-ethylphenyl)propyl, 2-(2,3-dimethylphenyl)propyl, 2-(2,5-dimethylphenyl)propyl, 2-(3,5-dimethylphenyl)propyl, 2-(2,4-dimethylphenyl)propyl, 2-(3,4-dimethylphenyl)propyl, 2-(2,5-dimethylphenyl)butyl, 4-(1-methylethyl)phenylmethyl, 2-(4-(1,1-dimethylethyl)phenyl)ethyl, 2-(4-(1-methylethyl)phenyl)propyl, and 2-(3-(1-methylethyl)phenyl)propyl.

Specific examples of phenylalkyl in which optional hydrogen on benzene ring is replaced by alkyl having 1 to 10 carbon atoms and hydrogen in the alkyl is replaced by fluorine include 3-trifluoromethylphenylmethyl, 2-(4-trifluoromethylphenyl)ethyl, 2-(4-nonafluorobutylphenyl)ethyl, 2-(4-tridecafluorohexylphenyl)ethyl, 2-(4-heptadecafluorooctylphenyl)ethyl, 1-(3-trifluoromethylphenyl)ethyl, 1-(4-trifluoromethylphenyl)ethyl, 1-(4-nonafluorobutylphenyl)ethyl, 1-(4-tridecafluorohexylphenyl)ethyl, 1-(4-heptadecafluorooctylphenyl)ethyl, 2-(4-nonafluorobutylphenyl)propyl, 1-methyl-1-(4-nonafluorobutylphenyl)ethyl, 2-(4-tridecafluorohexylphenyl)propyl, 1-methyl-1-(4-tridecafluorohexylphenyl)ethyl, 2-(4-heptadecafluorooctylphenyl)propyl, and 1-methyl-1-(4-heptadecafluorooctylphenyl)ethyl.

Specific examples of phenylalkyl in which optional hydrogen on benzene ring is replaced by alkyl having 1 to 10 carbon atoms and —CH$_2$— in the alkyl is replaced by —CH=CH— include 2-(4-ethenylphenyl)ethyl, 1-(4-ethenylphenyl)ethyl, and 1-(2-(2-propenyl)phenyl)ethyl.

Specific examples of phenylalkyl in which optional hydrogen on benzene ring is replaced by alkyl having 1 to 10 carbon atoms and —CH$_2$— in the alkyl is replaced by —O— include 4-methoxyphenylmethyl, 3-methoxyphenylmethyl, 4-ethoxyphenylmethyl, 2-(4-methoxyphenyl)ethyl, 3-(4-methoxyphenyl)propyl, 3-(2-methoxyphenyl)propyl, 3-(3,4-dimethoxyphenyl)propyl, 11-(4-methoxyphenyl)undecyl, 1-(4-methoxyphenyl)ethyl, (3-methoxymethylphenyl)ethyl, and 3-(2-nonadecafluorodecenyloxyphenyl)propyl.

Specific examples of phenylalkyl in which optional hydrogen on benzene ring is replaced by alkyl having 1 to 10 carbon atoms and one —CH$_2$— in the alkyl is replaced by cycloalkylene include cyclopentylphenylmethyl, cyclopentyloxyphenylmethyl, cyclohexylphenylmethyl, cyclohexylphenylethyl, cyclohexylphenylpropyl, and cyclohexyloxyphenylmethyl (the case where another —CH$_2$— of the alkyl is replaced by —O— is also included in these examples).

Specific examples of phenylalkyl in which optional hydrogen on benzene ring is replaced by alkyl having 1 to 10 carbon atoms and one —CH$_2$— in the alkyl is replaced by phenylene include 2-(4-phenoxyphenyl)ethyl, 2-(4-phenoxyphenyl)propyl, 2-(2-phenoxyphenyl)propyl, 4-biphenylylmethyl, 3-biphenylylethyl, 4-biphenylylethyl, 4-biphenylylpropyl, 2-(2-biphenylyl)propyl, and 2-(4-biphenylyl)propyl (the case where another —CH$_2$— of the alkyl is replaced by —O— is also included in these examples).

Specific examples of phenylalkyl in which at least two hydrogen of benzene ring is replaced by different groups include 3-(2,5-dimethoxy-3,4,6-trimethylphenyl)propyl, 3-chloro-2-methylphenylmethyl, 4-chloro-2-methylphenylmethyl, 5-chloro-2-methylphenylmethyl, 6-chloro-2-methylphenylmethyl, 2-chloro-4-methylphenylmethyl, 3-chloro-4-methylphenylmethyl, 2,3-dichloro-4-methylphenylmethyl, 2,5-dichloro-4-methylphenylmethyl, 3,5-dichloro-4-methylphenylmethyl, 2,3,5-trichloro-4-methylphenylmethyl, 2,3,5,6-tetrachloro-4-methylphenylmethyl, 2,3,4,6-tetrachloro-5-methylphenylmethyl, 2,3,4,5-tetrachloro-6-methylphenylmethyl, 4-chloro-3,5-dimethylphenylmethyl, 2-chloro-3,5-dimethylphenylmethyl, 2,4-dichloro-3,5-dimethylphenylmethyl, 2,6-dichloro-3,5-dimethylphenylmethyl, 2,4,6-trichloro-3,5-dimethylphenylmethyl, 3-bromo-2-methylphenylmethyl, 4-bromo-2-methylphenylmethyl, 5-bromo-2-methylphenylmethyl, 6-bromo-2-methylphenylmethyl, 3-bromo-4-methylphenylmethyl, 2,3-dibromo-4-methylphenylmethyl, 2,3,5-tribromo-4-methylphenylmethyl, 2,3,5,6-tetrabromo-4-methylphenylmethyl, and 11-(3-chloro-4-methoxyphenyl)undecyl.

In addition, particularly preferable examples of phenyl in phenylalkyl include: unsubstituted phenyl; and phenyl having as a substituent at least one of fluorine, alkyl having 1 to 4 carbon atoms, ethenyl, and methoxy. Specific examples of phenylalkyl in which —CH$_2$— of alkylene is replaced by —O—, —CH=CH—, or cycloalkylene include 3-phenoxypropyl, 1-phenylethenyl, 2-phenylethenyl, 3-phenyl-2-propenyl, 4-phenyl-4-pentenyl, 13-phenyl-12-tridecenyl, phenylcyclohexyl, and phenoxycyclohexyl. Examples of phenylalkenyl in which hydrogen on benzene ring is replaced by fluorine or methyl include 4-fluorophenylethenyl, 2,3-difluorophenylethenyl, 2,3,4,5,6-pentafluorophenylethenyl, and 4-methylphenylethenyl.

Of these groups, preferable R is selected from the group consisting of alkyl having 1 to 45 carbon atoms, substituted or unsubstituted phenyl, and substituted or unsubstituted phenylalkyl. A more preferable example of R is selected from the group consisting of substituted or unsubstituted phenyl and substituted or unsubstituted phenylalkyl.

Alkylene of the substituted or unsubstituted phenylalkyl has preferably 1 to 8 carbon atoms, optional hydrogen on benzene ring in the phenylalkyl may be replaced by fluorine or alkyl having 1 to 4 carbon atoms, and optional —CH$_2$— in the alkylene may be replaced by —O—, —CH=CH—, or cycloalkylene.

When phenyl in each of these groups has multiple substituents, the substituents may be identical to or different from each other. In addition, all of R's in the formula (1) is preferably the same group selected from these preferable examples.

Still more preferable examples of R include phenyl, halogenated phenyl, phenyl having at least one methyl, methoxyphenyl, phenylmethyl, phenylethyl, phenylbutyl, 2-phenylpropyl, 1-methyl-2-phenylethyl, pentafluorophenylpropyl, 4-ethylphenylethyl, 3-ethylphenylethyl, 4-(1,1-dimethylethyl)phenylethyl, 4-ethenylphenylethyl, 1-(4-ethenylphenyl)ethyl, and 4-methoxyphenylpropyl. Of these, phenyl is particularly preferable.

Next, m in the formula (1) will be explained. m represents an integer of 1 to 1,000, or preferably 1 to 100.

When m represents 1, R$^1$ is independently selected from the group consisting of hydroxyl, alkoxy, acetoxy, and —OSi(A)$_3$.

When m represents 2 to 1,000, R$^1$ is independently selected from the group consisting of hydrogen, hydroxyl, halogen, alkoxy, acetoxy, —OSi(A)$_3$, and a group defined in the same manner as R.

When any one of R$^1$'s represents —OSi(A)$_3$, A independently represents hydrogen; alkyl having 1 to 10 carbon atoms in which optional hydrogen may be replaced by hydroxyl, halogen, carboxyl, ester, 2,4-dioxo-3-oxacyclopentyl, acetoxy, amino group, isocyanate, oxiranyl, 3,4-epoxycyclohexyl, oxetanyl, cyano, vinyl, (meth)acryloyl, 4-vinylphenyl, alkyleneoxy, or mercapto; or phenyl. Optional —CH$_2$— in the alkyl may be replaced by —O—, —CH=CH— or phenylene. It should be noted that hydrogen of each of hydroxyl, carboxyl, amino group, and mercapto may be replaced by, for example, trimethylsilyl.

It should be noted that two of A's may form dicarboxylic anhydride.

n in the formula (2) represents an integer of 1 to 1,000, and preferably 1 to 100. R$^2$ is independently selected from the group consisting of hydrogen and —Si(A)$_3$.

When anyone of R$^2$'s represents —OSi(A)$_3$, A independently represents hydrogen; alkyl having 1 to 10 carbon atoms in which optional hydrogen may be replaced by hydroxyl, halogen, carboxyl, ester, 2,4-dioxo-3-oxacyclopentyl, acetoxy, amino group, isocyanate, oxiranyl, 3,4-epoxycyclohexyl, oxetanyl, cyano, vinyl, (meth)acryloyl, 4-vinylphenyl, alkyleneoxy, or mercapto; or phenyl. Optional —CH$_2$— in the alkyl may be replaced by —O—, —CH=CH— or phenylene. It should be noted that hydrogen of each of hydroxyl, carboxyl, amino group, and mercapto may be replaced by, for example, trimethylsilyl. It should be noted that two of A's may form dicarboxylic anhydride.

To be specific, A is independently selected from the followings.

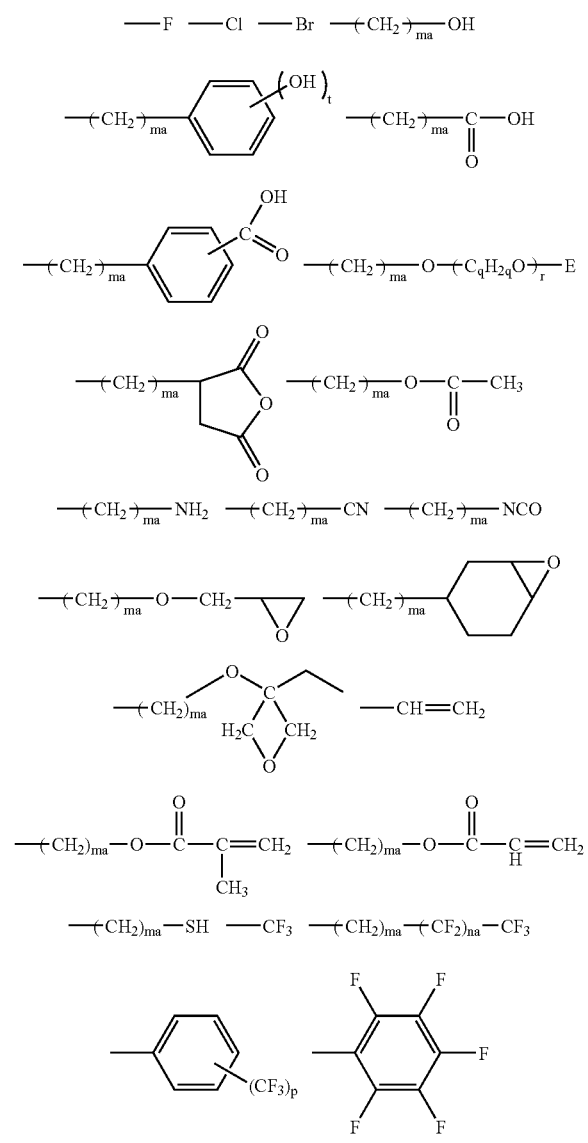

In these formula, ma represents an integer of 2 to 10, na represents an integer of 0 to 15, q represents an integer of 2 or 3, r represents an integer of 2 to 200, t represents an integer of 1 to 3, and E represents hydrogen or alkyl having 1 to 4 carbon atoms. In the above examples, each of —CF$_3$ is bound to benzene ring an optional position. r represents an integer of preferably 2 to 100, more preferably 2 to 20.

Particularly preferable examples of the polysiloxane represented by the formula (1) or (2) include the following compounds; provided that the compound of the present invention is not limited to the following compounds.

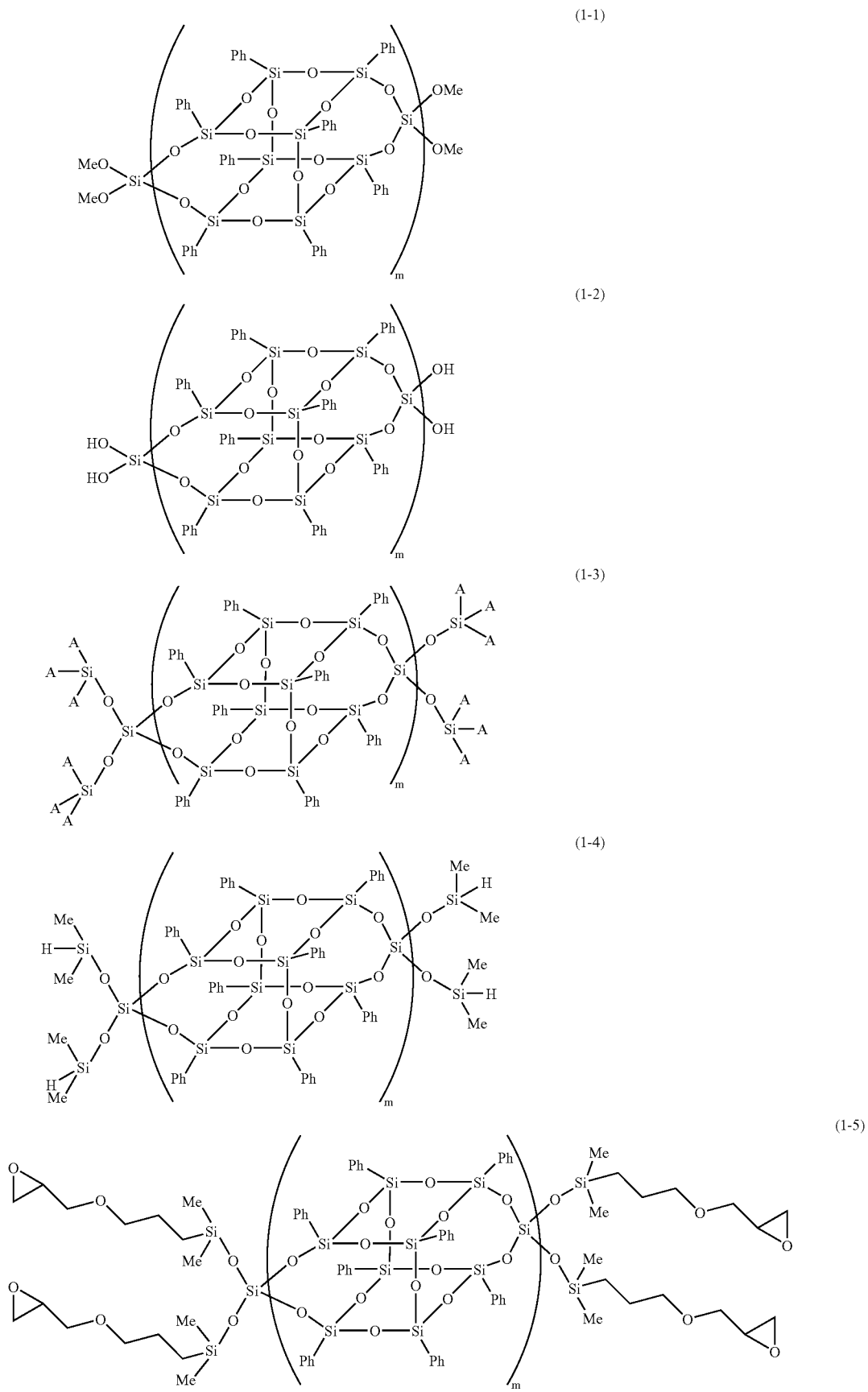

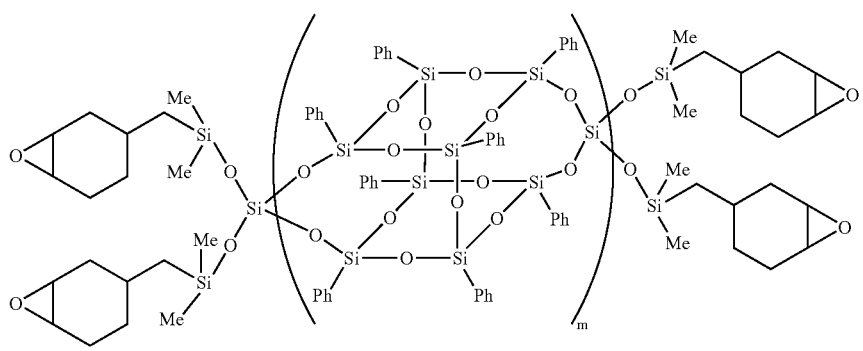
(1-6)

It should be noted that A in the formula (1-3) represents a group defined in the same manner as A in —Si (A)$_3$ of the above formula (1) and (2). In the formula (1-1), (1-2), (1-3), (1-4) and (1-6), m represents an integer of 1 to 1,000. In the formula (1-5), m represents an integer of 2 to 1,000.

Next, a method of producing a compound in which any one of R$^1$'s in the formula (1) is alkoxy, acetoxy, halogen, or hydroxyl will be described.

Such compound can be represented as a formula (1-a) or (1-b) shown in the following reaction formula (I), and can be obtained by reacting a compound represented by the formula (1-0-1) which is obtainable by the method disclosed by the inventors of the present invention (Japanese Patent Application Laid-open No. 2006-182650) with a silane compound represented by the formula (1-0-2) which is commercially available, in an organic solvent in such a manner that a mixing ratio of the number of moles (N) of Compound (1-0-2) to the number of moles (M) of Compound (1-0-1) is not less than 1, and preferably 1 to 10.

The organic solvent that can be used in the reaction is not particularly limited as long as the solvent does not inhibit the progress of the reaction. Examples of a preferable organic solvent include: ethers such as diethyl ether, tetrahydrofuran (THF), and dioxane; and esters such as methyl acetate, ethyl acetate, and butyl acetate. One kind thereof may be used alone, or two or more kinds thereof may be used in combination.

The volume of the organic solvent is not particularly limited in the present invention, but the volume is preferably such that the solid content concentration of a reaction solution is 1% to 50% in consideration of the efficient production of the compound.

Here, X in the formula (1-0-2) independently represents a group capable of reacting with silanol, and specifically represents halogen, alkoxy, or acetoxy. Specific examples of the Compound (1-0-2) include tetramethoxysilane, tetraethoxysilane, tetraisopropoxysilane, tetrachlorosilane, tetrabromosilane, tetraiodosilane, and tetraacetoxysilane. Of these, tetrachlorosilane and tetraacetoxysilane are preferable because these compounds are easily commercially available.

Then, Compound (1-a) thus obtained is hydrolyzed by using an acid such as hydrochloric acid, acetic acid, or sulfuric acid as a catalyst as required, thereby Compound (1-b) can be obtained.

Reaction Formula (I)

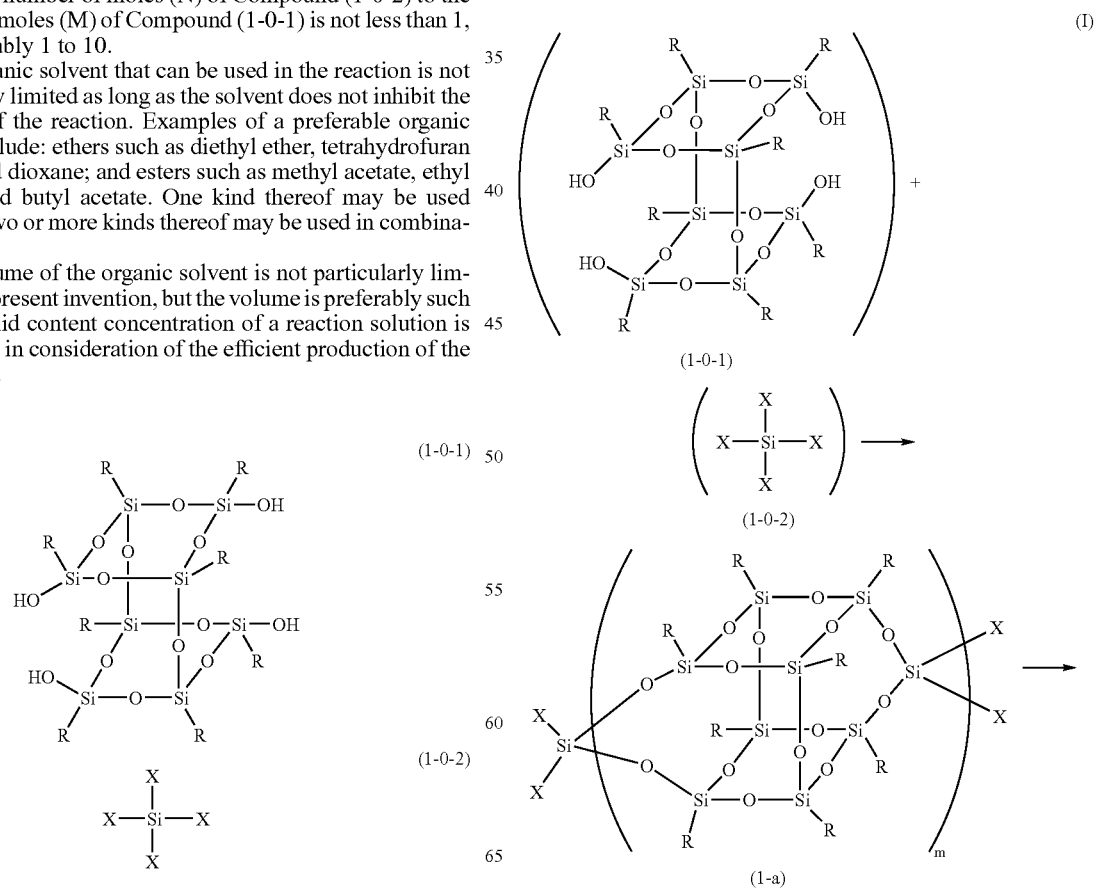

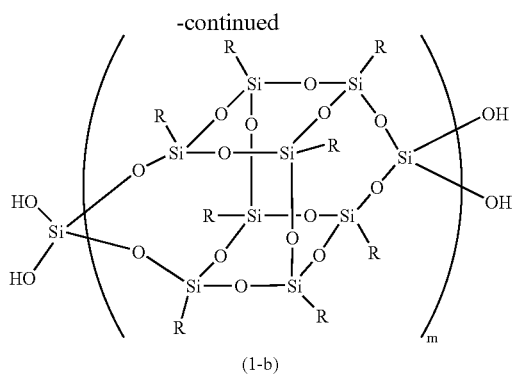

(1-b)

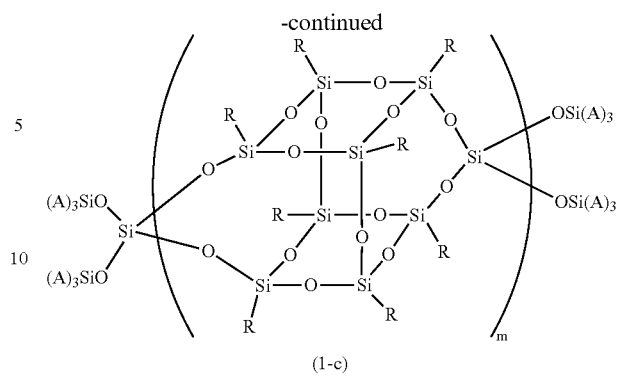

(1-c)

Next, a method of producing Compound (1-c) in which: any one of $R^1$'s in the formula (1) represents —OSi(A)$_3$; whereby A independently represents (i) hydrogen (bound to Si), (ii) alkyl having 1 to 10 carbon atoms in which optional hydrogen may be replaced by hydroxyl, halogen, carboxyl, ester, 2,4-dioxo-3-oxacyclopentyl, acetoxy, amino group, isocyanate, oxiranyl, 3,4-epoxycyclohexyl, oxetanyl, cyano, vinyl, (meth)acryloyl, 4-vinylphenyl, alkyleneoxy, or mercapto and optional —CH$_2$— in the alkyl may be replaced by —O—, —CH=CH— or phenylene, or (iii) phenyl will be described.

Such compound can be obtained by reacting Compound (1-b) with Compound (1-0-3) in organic solvent preferably in the presence of tertiary amine (NR$_3$) as shown in the formula (II).

Organic solvent to be used for the reaction is not particularly limited as long as it does not inhibit the progress of the reaction. Examples of preferable solvent include: aliphatic hydrocarbons such as hexane and heptane; aromatic hydrocarbons such as benzene, toluene, and xylene; ethers such as diethyl ether, tetrahydrofuran (THF), and dioxane; halogenated hydrocarbons such as methylene chloride and carbon tetrachloride; and esters such as ethyl acetate. Of these, organic solvents such as aromatic hydrocarbons and ethers are more preferable and toluene and THF are still more preferable.

Further, the reaction can be easily promoted by adding tertiary amine such as triethylamine. The addition amount of the tertiary amine is not particularly limited as long as the reaction can be progressed, but the addition amount of triethylamine is, for example, 0.1 to 10 fold moles, or preferably 1 to 5 fold moles with respect to Compound (1-0-3).

(II)

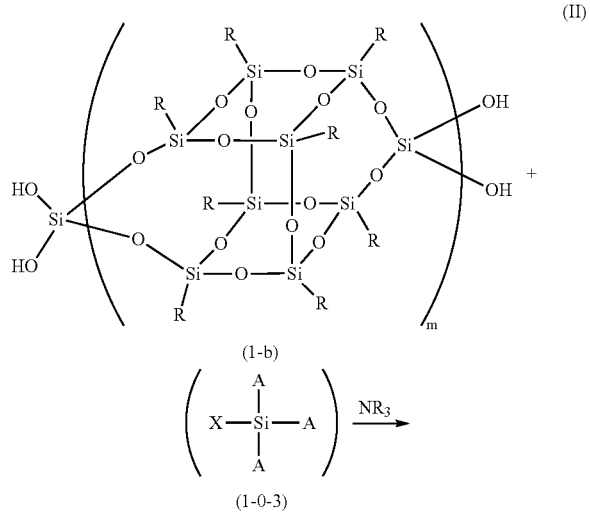

Next, a method of producing Compound (1) in which: any one of $R^1$'s in the formula (1) represents —OSi(A)$_3$ whereby at least one of A's independently represents (i) alkyl having 2 to 10 carbon atoms in which optional hydrogen may be replaced by hydroxyl, halogen, ester, cyano, vinyl, acetoxy, (meth)acryloyl, carboxyl, amino group, isocyanate, oxiranyl, 3,4-epoxycyclohexyl, oxetanyl, mercapto, 2,4-dioxo-3-oxacyclopentyl, or alkyleneoxy and optional —CH$_2$— in the alkyl may be replaced by —O—, —CH=CH— or phenylene, or (ii) phenyl; and the remaining of A's independently represent alkyl having 1 to 10, phenyl or phenylalkyl carbon atoms will be described.

As shown below, such compound can be obtained through two steps. At first, Compound (1-c) in which at least one of A's represents hydrogen and the remaining of A's represent alkyl having 1 to 10 carbon atoms, phenyl or phenylalkyl is synthesized by reacting Compound (1-b) with Compound (1-0-3) in which at least one of A's represents hydrogen and the remaining of A's independently represent alkyl having 1 to 10 carbon atoms, phenyl, or phenylalkyl in the same manner as the above-mentioned method.

Specific examples of "Compound (1-0-3) in which at least one of A's represents hydrogen and the remaining of A's independently represent alkyl having 1 to 10 carbon atoms or phenyl" include dimethylchlorosilane, diethylchlorosilane, methylethylchlorosilane, methylhexylchlorosilane, diisopropylchlorosilane, di-t-butylchlorosilane, dicyclopentylchlorosilane, dicyclohexylchlorosilane, dinormaloctylchlorosilane, methylphenylchlorosilane, and diphenylchlorosilane.

Secondly, as shown in a formula (III), Compound (1-c) obtained in the first step is reacted with Compound (1-0-5) as shown below in organic solvent in the presence of hydrosilylation catalyst, thereby Compound (1-d) is obtained.

Formula (III)

(III)

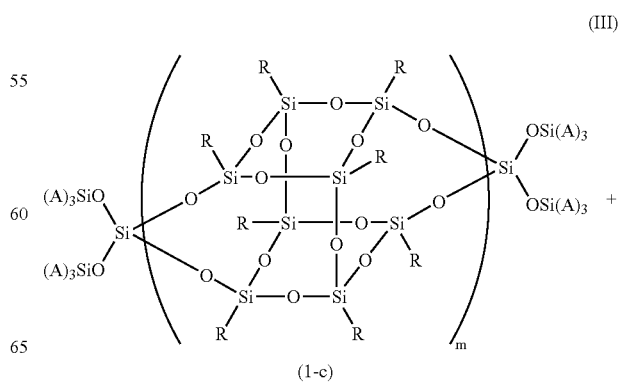

+

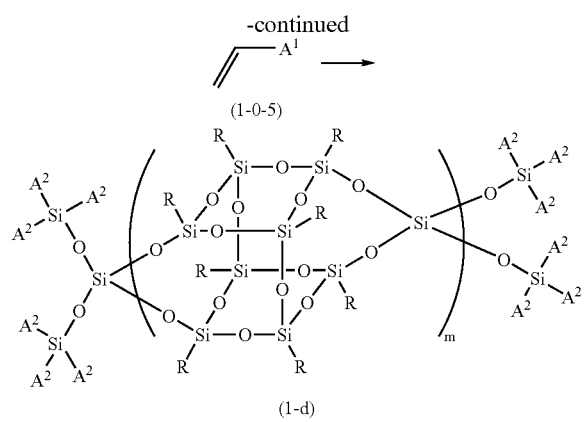

(1-0-5)

(1-d)

In the formula (1-0-5), $A^1$ represents alkyl having 1 to 8 carbon atoms whereby optional hydrogen may be replaced by hydroxyl; halogen; carboxyl; ester; 2,4-dioxo-3-oxa-cyclopentyl; acetoxy; amino group; isocyanate; oxiranyl; 3,4-epoxycyclohexyl; oxetanyl; cyano; vinyl; (meth)acryloyl; 4-vinylphenyl; alkyleneoxy; or mercapto; and optional —$CH_2$— in the alkyl may be replaced by —O—, —CH=CH— or phenylene. It should be noted that hydrogen of each of hydroxyl, carboxyl, amino group, and mercapto may be replaced by, for example, trimethylsilyl.

R in the formula (1-d) represents a group defined in the same manner as R in the formula (1-c). At least one of $A^2$'s represents —$CH_2CH_2A^1$, and the remaining of $A^2$'s represent are independently selected from alkyl having 1 to 10 carbon atoms, phenyl, and phenylalkyl.

Examples of the compound represented by (1-0-5) having both of hydroxyl and alkenyl include allyl alcohol, 3-buten-1-ol, 3-buten-2-ol, ethyleneglycol monovinylether, ethyleneglycol monoallylether, diethyleneglycol monoallylether, glycerine monoallylether, trimethylolethane monoallylether, trimethylolpropane monoallylether, polyethyleneglycol monoallylether, polypropyleneglycol monoallylether, 1-ethenyl-cyclobutanol, 2-ethenyl-cyclobutanol, 3-ethenyl-cyclobutanol, vinylphenol, 2-allylphenol, 4-allylphenol, 4-allyl-2-methoxyphenol, 4-allyl-2,6-dimethoxyphenol, 4-(2-propenyl)-1,2-benzenediol, and 4-(2,4-dihydroxyphenyl)-3-butene-2-one. The hydroxyl of these compounds may be protected as cyclic or branched-chain carbonyl having 3 to 30 carbon atoms, ester, ether, acetal, ketal, or silylether. Of these compounds, preferable are allylalcohol, ethyleneglycol monoallylether, glycerine monoallylether, trimethylolpropane monoallylether, 2-allyl phenol, and 4-allyl phenol because of easily availability.

Examples of the compound represented by (1-0-5) having carboxyl and alkenyl include (meth)acrylic acid, crotonic acid, isocrotonic acid, vinyl acetate, 3-butenoic acid, 2-methyl-3-butenoic acid, 2,2-dimethyl-3-butenoic acid, 2-n-propyl-3-pentenoic acid, 4-pentenoic acid, 3-methyl-4-pentenoic acid, 2,2-dimethyl-4-pentenoic acid, 3,3-dimethyl-4-pentenoic acid, 4-hexenoic acid, 5-hexenoic acid, 2,6-heptadienoic acid, 7-octenoic acid, 8-nonenoic acid, 9-decenoic acid, 10-undecenoic acid, 11-dodecenoic acid, propiolic acid, 2-butynoic acid, maleic acid, fumaric acid, acethylene carboxylic acid, 2-vinyl benzoate, 3-vinyl benzoate, 4-vinyl benzoate, and 4-allyl-2,3,5,6-tetrafluorobenzoate. Herein, (meth)acrylic acid refers to acrylic acid and methacrylic acid. The carboxyl group of these compounds may be protected as ester, or trialkyl silyl. Of these compounds, preferable are (meth)acrylic acid, vinyl acetate, 4-pentenoic acid, 10-undecenoic acid, and 4-vinyl benzoate because of easily availability.

Examples of the compound represented by (1-0-5) having both of isocyanate and alkenyl include vinyl isocyanate, allyl isocyanate, 3-isocyanate-2-methyl-1-propene, methacryloyl isocyanate, isocyanate ethylmethacrylate, vinylbenzyl isocyanate, 3-isocyanate-1-butene, 3-isocyanate-3-methyl-1-butene, 4-isocyanate-2-methyl-1-butene, 4-isocyanate-3,3-dimethyl-1-butene, 4-isocyanate-4-methyl-1-pentene, and 5-isocyanate-1-pentene. Of these compounds, preferable are vinyl isocyanate, allyl isocyanate, and methacryloyl isocyanate because of easily availability.

Examples of the compounds represented by (1-0-5) having both of oxiranyl and alkenyl include allylglycidyl ether, 2-methylallylglycidyl ether, vinylglycidyl ether, glycideyl maleate, glycidyl itaconate, glycidyl acrylate, glycidyl methacrylate, 1,2-epoxy-6-heptene, 1,2-epoxy-3-butene, 2-cyclohexene-1-glycidyl ether, cyclohexene-4,5-glycidylcarboxylate, cyclohexene-4-glycidyl carboxylate, 5-norbornene-2-methyl-2-glycidyl, carboxylate, and endocis-bicyclo[2.2.1]-5-heptene-2,3-diglycidyl dicarboxylate. Preferable is allyl glycidyl ether because of easily availability.

Examples of Compound (1-0-5) having mercapto and alkenyl include allyl mercaptan and 2-methyl-2-propene-1-thiol.

Examples of Compound (1-0-5) having 2,4-dioxo-3-oxacyclopentyl and alkenyl include allylsuccinic anhydride, isobutylsuccinic anhydride, isobutenylsuccinic anhydride, bicyclo[2.2.2]octo-7-ene-2,3,5,6-tetracarboxylic dianhydride, and 5-norbornene-2,3-dicarboxylic anhydride. Of these compounds, allylsuccinic anhydride and 5-norbornene-2,3-dicarboxylic anhydride are preferable in consideration of easy availability.

The compound represented by compound (1-0-5) having alkyleneoxy and alkenyl is commercially available from NOF CORPORATION and the like. In the case of polyethylene glycol monoallyl ether, UNIOX PKA-5001, PKA-5002, PKA-5003, PKA-5004, and PKA-5005 are exemplified. In the case of methoxypolyethylene glycol allylether, UNIOX PKA-5006, PKA-5007, PKA-5008, PKA-5009, and PKA-5010 are exemplified. In the case of polypropylene glycol monoallylether, UNISAFE PKA-5014 is exemplified. In the case of polyethylene glycol polypropylene glycol allylether, UNISAFE PKA-5011, PKA-5012, and PKA-5013 are exemplified. If there is no commercially available product for some compounds, allylether having alkyleneoxy can be obtained by reacting polyalkylene glycol or monoether compound thereof with sodium hydride to produce sodium alcoholate, thereby reacting it with allylbromide.

Examples of Compound (1-0-5) having amino group and alkenyl include allylamine, butenylamine, hexenylamine, octenylamine, and decenylamine.

Examples of compound (1-0-5) containing oxcetanyl and alkenyl include 3-vinyl oxcetane, 3-methyl-3-vinyl oxcetane, 3-ethyl-3-vinyl oxcetane, 3-allyloxcetane, 3-allyl-3-methyloxcetane, 3-allyl-3-ethyloxcetane, [(3-oxcetanyl)methyl]vinyl ether, [(3-methyl-3-oxcetanyl)methyl]vinyl ether, [(3-ethyl-3-oxcetanyl)methyl]vinyl ether, 3-allyloxymethyl oxcetane, 3-allyloxymethyl-3-methyloxcetane, 3-allyloxymethyl-3-ethyloxcetane, 3-allyloxyethyl oxcetane, 3-allyloxyethyl-3-methyloxcetane, and 3-allyloxyethyl-3-ethyloxcetane. Particularly preferable are 3-allyloxymethyl oxcetane, 3-allyloxymethyl-3-methyloxcetane, 3-allyloxymethyl-3-ethyloxcetane, 3-allyloxymethyloxcetane, 3-allyloxyethyl-3-methyloxcetane, and 3-allyloxyethyl-3-ethyloxcetane.

The above-mentioned first step of obtaining Compound (1-c) may be performed by a method involving reacting Compound (1-a) with Compound (1-0-4) shown below or by a method involving reacting Compound (1-a') with Compound (1-0-4).

One of Compounds (1-0-5) having any one of the above-mentioned functional groups and alkenyl is allowed to react with Compound (1-c) in which at least one of A's represents hydrogen and the remaining of A's independently represent alkyl having 1 to 10 carbon atoms or phenyl, thereby Compound (1-d) in which at least one of A's represents —$CH_2CH_2A^1$, and the remaining of A's independently represent alkyl having 1 to 10 carbon atoms or phenyl is obtained. Reacting at least two kinds of Compounds (1-0-5)

each having any one of the functional groups with Compound (1-c) in which at least two of A represents hydrogen suffices for the synthesis of Compound (1-d) having at least two different functional groups. In this case, Compound (1-d) can be obtained by reacting two kinds of Compounds (1-0-5) having the functional group with Compound (1-c) in mixture or by reacting the first Compound (1-0-5) and the second Compound (1-0-5) with Compound (1-c) sequentially in consideration of a difference in reactivity of the two kinds of Compounds (1-0-5).

A solvent to be used in the hydrosilylation reaction between Compound (1-c) in which at least one of A's represents hydrogen and the remaining of A's independently represent alkyl having 1 to 10 carbon atoms or phenyl and compound (1-0-5) having the functional group is not particularly limited as long as the solvent does not inhibit the reaction. Preferable examples of the solvent include: aliphatic hydrocarbons such as hexane and heptane; aromatic hydrocarbons such as benzene, toluene, and xylene; ethers such as diethyl ether, tetrahydrofuran (THF), and dioxane; halogenated hydrocarbons such as methylene chloride and carbon tetrachloride; and esters such as methyl acetate and ethyl acetate. Each of these solvents may be used alone, or two or more thereof may be used in combination. Of these solvents, the aromatic hydrocarbons are preferable, and, of the aromatic hydrocarbons, toluene is particularly preferable.

Although the reaction between Compound (1-c) and Compound (1-0-5) having the functional group does not necessarily require a solvent, solvent, if used, is prepared so as to have a concentration of preferably 0.05 to 80 wt %, or more preferably 30 to 70 wt %.

The ratio of Compound (1-0-5) having the functional group with respect to Compound (1-c) varies depending on purposes. For example, when each of all SiH groups of Compound (1-c) is allowed to react with Compound (1-0-5), the number of moles of Compound (1-0-5) must be equal to or larger than the number of moles of SiH groups of Compound (1-c) In addition, when part of —SiH groups are left, the number of moles of the Compound (1-0-5) having the functional group has only to be equal to or smaller than the number of moles of Compound (1-c).

The reaction may be performed at room temperature, or may be performed under heating so that the reaction is promoted. In addition, the reaction system may be cooled as required for controlling a secondary reaction due to heat of the reaction.

Next, hydrosilylation catalyst to be used in the hydrosilylation reaction in the present invention will be described. A compound containing a transition metal such as platinum, rhodium, or palladium, which is generally commercially available, can be used as the hydrosilylation catalyst. Preferable examples of the hydrosilylation catalyst include Karstedt catalyst, Spier catalyst, and hexachloroplatinic acid; these compounds are well known in the technical field.

The hydrosilylation catalyst to be added has only to be used in such an amount that the transition metal in the catalyst accounts for $10^{-9}$ to 1 mol % of the SiH groups; and preferable addition amount is $10^{-7}$ to $10^{-3}$ mol %.

As shown in the following formula (IV), another method of producing Compound (1-c) involves reacting Compound (1-a) with Compound (1-0-4).

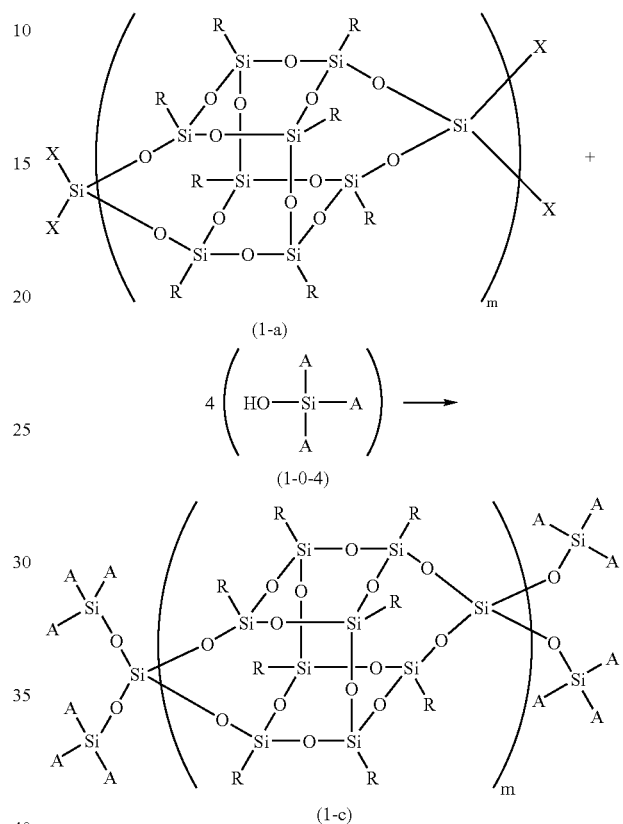

A in the formula (1-0-3), (1-0-4), and (1-c) each represent a group defined in the same manner as A in —OSi(A)$_3$ of R$^1$ or R$^2$ of the formula (1) or (2).

In addition, a compound represented by the formula (2-a) can be obtained by reacting Compound (1-0-1) with Compound (1-0-2) in such a manner that a ratio of the number of moles (N) of Compound (1-0-2) to the number of moles (M) of Compound (1-0-1) is 1 or less, or preferably 0.1 to 1 as shown in the following formula (V). Then, Compound (2-b) can be obtained from thus obtained Compound (2-a) in the same manner as in the formula (II) or (III).

(V)

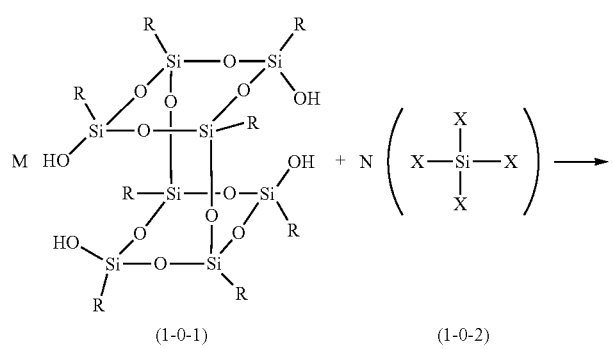

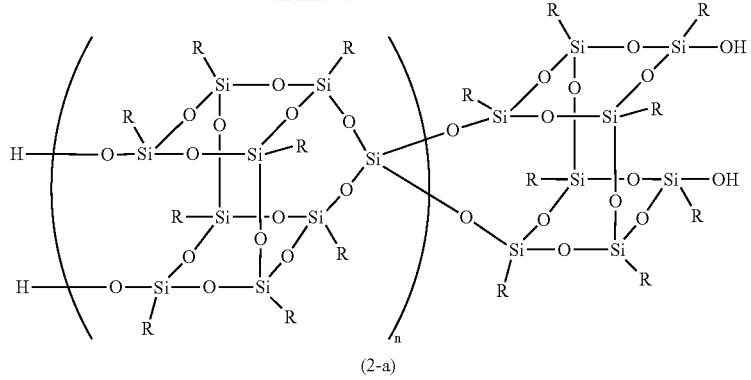

(2-a)

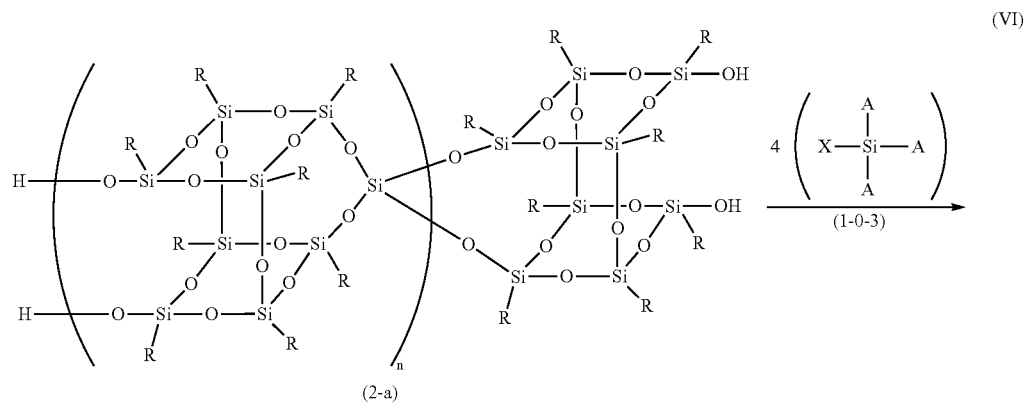

(2-a)    (VI)

(1-0-3)

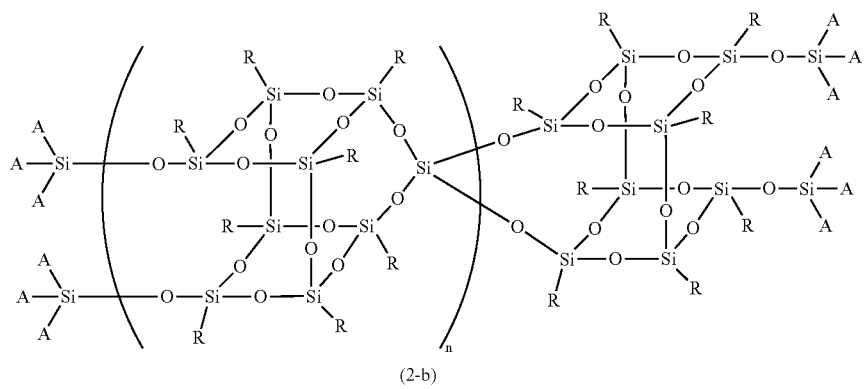

(2-b)

The following procedure may be adopted: after Compound (1-0-1) and Compound (1-0-2) have been reacted with each other at a ratio N/M of more than 1 to provide Compound (1-a), Compound (1-a) is allowed to react with Compound (1-0-1), or after Compound (1-0-1) and Compound (1-0-2) have been allowed to react with each other at a ratio M/N of more than 1 to provide Compound (2-a), Compound (2-a) is allowed to react with Compound (1-0-2). Further, such reactions may be alternately repeated.

It should be noted that a reaction similar to that described above can be performed by reacting Compound (1-0-1') instead of Compound (1-0-1) with Compound (1-0-2'). In a formula (1-0-1'), M represents alkali metal, and preferably sodium or potassium.

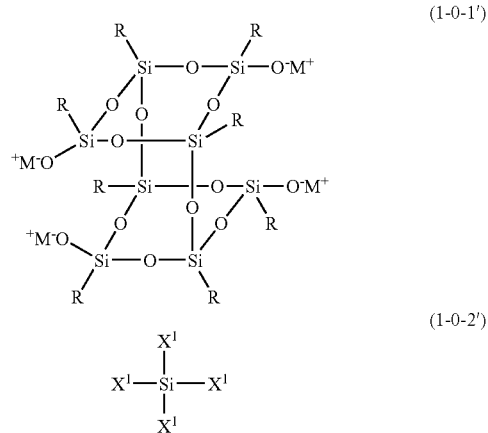

(1-0-1')

(1-0-2')

In this case, Compound (1-a') shown below or Compound (2-a) shown above is obtained.

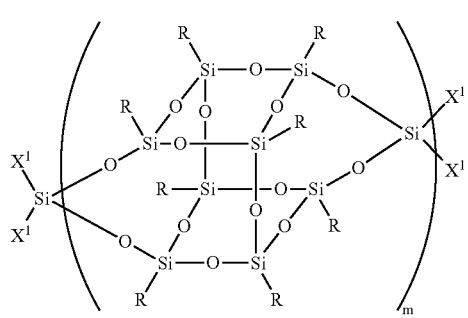

(1-a')

In this case, $X^1$ in the formula (1-a') and (1-0-2') represent halogen, and preferably chlorine. In addition, a reaction for synthesizing Compound (1-c) from Compound (1-b) and for synthesizing Compound (2-b) from Compound (2-a) can be performed in the same manner as in the method of obtaining Compound (1-c) from Compounds (1-b) and (1-0-3) represented by the above-mentioned reaction formula (II) and the method of obtaining Compound (2-b) from Compounds (2-a) and (1-0-3) represented by the above-mentioned reaction formula (VI), respectively.

In addition, Compound (1-d) can also be obtained by performing such reaction as shown below. Here, A represents a group defined in the same manner as A in —OSi(A)$_3$ of the formula (1) and (2), and X represents a group capable of reacting with silanol such as halogen, alkoxy, or acetoxy. Specific examples of Compound (1-0-6) include dichlorosilane and dichlorodiphenylsilane.

The above-mentioned reaction between the compound represented by the formula (1-0-1) and the compound represented by the formula (1-0-2) can be performed in an organic solvent. The above-mentioned reaction between the compound represented by the formula (1-0-1') and the compound represented by the formula (1-0-2') can be performed in an organic solvent.

An organic solvent to be used for production of the polysiloxane of the present invention can be used as long as the organic solvent does not inhibit the progress of the reaction for the production. Specific examples of the organic solvent include: aromatic hydrocarbons such as benzene, toluene, and xylene; aliphatic hydrocarbons such as hexane and heptane; alcohols such as methanol, ethanol, n-propanol, and iso-propanol; ethers such as dimethyl ether, diethyl ether, tetrahydrofuran, and 1,4-dioxane; acetates such as methyl acetate, ethyl acetate, and butyl acetate; amides such as N,N-dimethylformamide, N,N-dimethylacetamide, and N-methyl-2-pyrrolidone; ketones such as acetone, 2-butanone, and methyl-iso-butyl ketone; acetonitrile; and dimethyl sulfoxide. Of those, tetrahydrofuran and the acetates are preferable because each of them can dissolve a raw material and a product. In addition, the volume of the organic solvent, which is not particularly limited in the present invention, is 0.01 to 100 parts by weight with respect to 1 part by weight of Compound (1-0-1). The reaction may be performed at room temperature, or may be performed under heating so that the reaction is promoted. When heat generation due to the reaction is not preferable, the reaction system may be cooled for the purpose of controlling the reaction.

A polysiloxane in which silsesquioxanes and Q structures are alternately bound [represented by each of the formula (1-a) and (2-a)] can be produced by such reaction.

Next, a method of capping the resultant polysiloxane [represented by each of the formula (1-a) and (2-a)] with a chlorosilane having a group will be described. A polysiloxane having a reactive group represented by each of the formula (1)

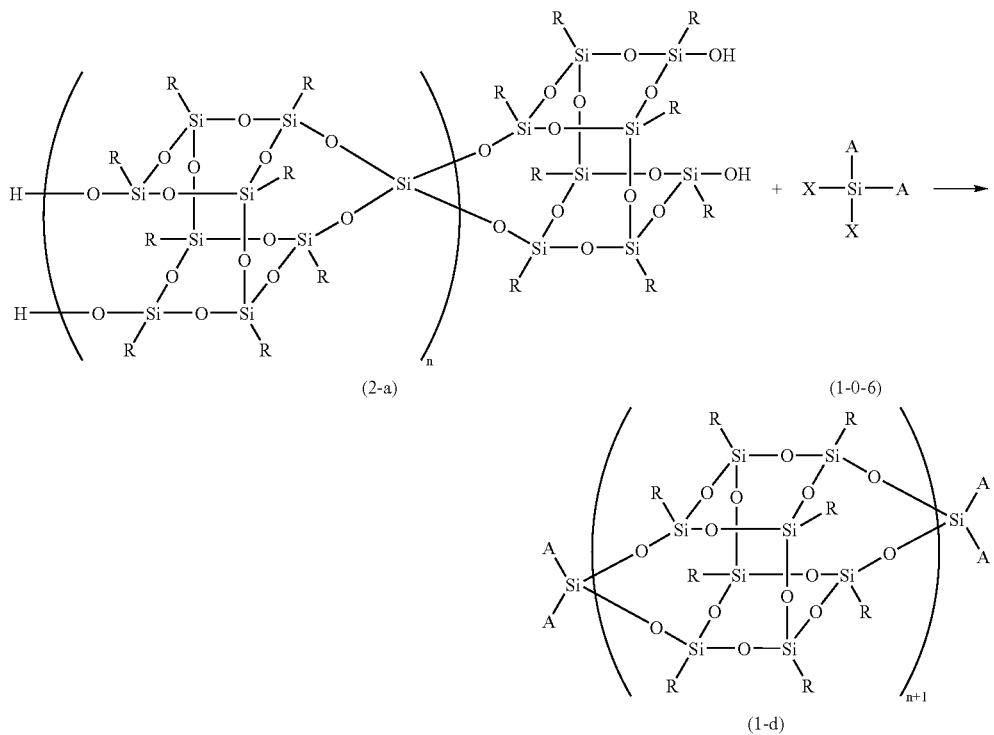

and (2) can be produced by applying a conventionally well-known method for reacting silanol and the chlorosilane with each other.

A polymer obtained by the present invention, that is, the polymer being obtained by introducing a skeleton having a cage-type structure to the main chain of the polymer, is assumed to have improved heat resistance and improved physical strength because rigidity is imparted to the polymer by virtue of restriction on the movement of the main chain. In addition, the polymer is expected to have high optical permeability because of the specificity of its structure. In addition, the polymer of the present invention can be utilized in a wide variety of applications because the polymer is expected to be excellent in, for example, solubility, heat resistance, mechanical strength, optical permeability, gas permeability, dielectric constant, flame retardancy, adhesiveness, and processability. Examples of expected applications of the polymer to electrical and electronic materials include: coating agents for substrates, such as a metal elution-preventing film, a gas barrier film, and an antireflection film; coating agents for semiconductors, such as a liquid sealing agent and an interlayer insulator; optical elements such as a microlens, a light-guiding plate, and an optical waveguide material; display substrates; and substrates for printed wiring. In addition, the polymer may be blended with any other components such as an antioxidant, a colorant, and a filler before use as required to such an extent that the initial properties of the polymer are not impaired.

EXAMPLES

Hereinafter, the present invention will be described in more detail by showing examples. However, the present invention is not limited to these examples. It should be noted that "Ph" and "Me" in the formula described in the examples represent "phenyl" and "methyl", respectively. In addition, a nuclear magnetic resonance spectrum was measured by using heavy tetrahydrofuran as a solvent and tetramethylsilane as an internal standard substance at room temperature unless otherwise stated.

Synthesis Example 1

<Synthesis of Compound (3-1)>

Phenyltrimethoxysilane (6.54 kg), sodiumhydroxide (0.88 kg), water (0.66 kg), and 2-propyl alcohol (26.3 liters) were loaded into a reaction vessel equipped with a reflux condenser, a temperature gauge, and a dropping funnel. In a stream of nitrogen, the heating of the mixture was initiated while the mixture was stirred. After the stirring had been continued for 6 hours from the initiation of reflux, the mixture was left at rest at room temperature overnight. Then, the reaction mixture was transferred to a filter, and was filtered while being pressurized with nitrogen gas. The resultant solid was washed with 2-propyl alcohol once and filtered, and then the filtrate was dried under reduced pressure at 80° C., whereby a white solid (3.3 kg) was obtained. The solid was defined as Compound (3-1).

Synthesis Example 2

<Synthesis of Compound (3-2)>

Compound (3-1) obtained in Synthesis Example 1 (162 g) and ethyl acetate (1,400 ml) was loaded into a reaction vessel equipped with a dropping funnel, a temperature gauge, and a stirring machine, and the mixture was stirred. In a stream of nitrogen, the reaction mixture was cooled so as to have a temperature of 5° C. Then, acetic acid (42 g) was dropped to the reaction mixture while the temperature of the reaction mixture was kept at 15° C. or lower, and the mixture was subjected to a reaction for 1 hour. Next, acetic acid was neutralized with a saturated aqueous solution of sodium hydrogen carbonate (100 g). After that, the reaction mixture was washed with ion-exchanged water and treated with 1N hydrochloric acid (10 g), and was then washed with ion-exchanged water so as to be neutral. The resultant organic phase was concentrated under reduced pressure at 50° C., methyl acetate (180 ml) was added to the residue, and the mixture was stirred at room temperature for 2 hours. After that, the mixture was filtered, thereby a white solid was obtained. The resultant white solid was dried under reduced pressure at 50° C., thereby Compound (3-2) as a powdery white solid (116 g) was obtained.

$^1$H NMR δ; 7.11-7.59 (m, 40H).
$^{29}$Si NMR δ; −79.22, −69.11.

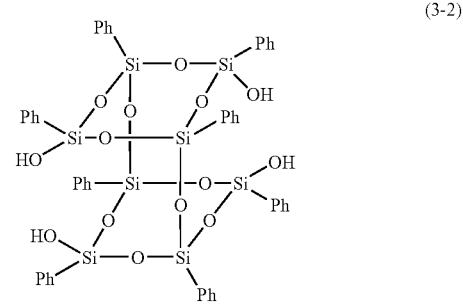

(3-2)

Example 1

<Synthesis of Compound (1-2-1)>

56 g (52 mmol) of Compound (3-2) obtained in Synthesis Example 2, 42 g (159 mmol) of tetraacetoxysilane, and 900 ml of ethyl acetate were loaded into a 2-L three-necked flask equipped with a reflux condenser, a temperature gauge, and a stirring device. In a stream of nitrogen, the mixture was heated to 60° C. while being stirred. After having been subjected to a reaction for 5 hours, the mixture was cooled to room temperature. 100 g of water were charged into the mixture, followed by stirring. After a solid had been filtered, the residue was concentrated at 50° C., thereby about 850 ml of the residue were removed by distillation. Then, the resultant reaction mixture was filtered, thereby a solid was obtained. The resultant solid was dried under reduced pressure at 70° C. for 2 hours, thereby 49 g of Compound (1-2-1) as a white solid were obtained.

$^1$H NMR δ(ppm); 6.15 (s, 4H), 7.09-7.70 (m, 40H). $^{29}$Si NMR δ(ppm); −89.8, −79.28, −78.75.

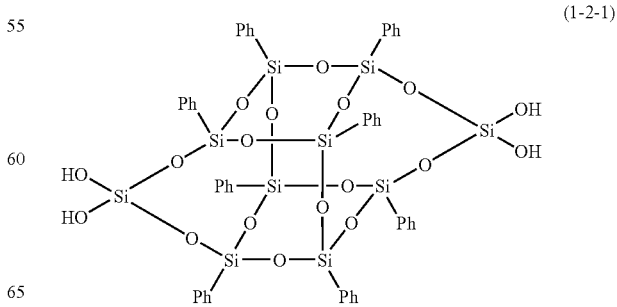

(1-2-1)

Example 2

<Synthesis of Compound (1-4-1)>

23 g (240 mmol) of chlorodimethylsilane and toluene (400 ml) were loaded into a 1-L four-necked flask equipped with a reflux condenser, a temperature gauge, a dropping funnel, and a stirring device. In a stream of nitrogen, 22 g (216 mmol) of triethylamine were dropped to the mixture while the mixture was stirred. Next, 48 g (40 mmol) of Compound (1-2-1) were dissolved in ethyl acetate (210 ml), and the solution was dropped to the reaction mixture so that the temperature of the reaction mixture should be kept at 35° C. or lower. After the mixture had been continuously subjected to a reaction for 3 hours, water (50 g) was added to the mixture, and followed by continuous stirring for 30 minutes. Then, the mixture was separated into an organic phase and an aqueous phase with a separating funnel. The resultant organic phase was washed with water so as to be neutral, and was then dried with anhydrous magnesium sulfate. Next, anhydrous magnesium sulfate was removed by filtration, and then the residue was concentrated under reduced pressure at 50° C. Methyl alcohol (120 ml) was added to the resultant residue, and the mixture was stirred for 4 hours. After that, the mixture was filtered, thereby a solid was obtained. The resultant white solid was dried under reduced pressure at 70° C. for 2 hours, thereby Compound (1-4-1) as a white solid was obtained.

$^1$H NMR δ(ppm); 0.11 (s, 24H), 4.70-4.73 (m, 4H), 7.15-7.58 (m, 40H).

$^{29}$Si NMR δ(ppm); −106.22, −79.38, −78.95, −3.04.

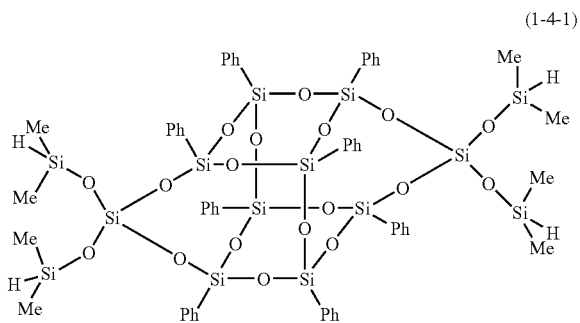

(1-4-1)

Example 3

<Synthesis of Compound (1-5-1)>

47 g (33 mmol) of Compound (1-4-1) synthesized in Example 2, 23 g (202 mmol) of allylglycidylether, and toluene (70 g) were loaded into a 200-ml four-necked flask equipped with a reflux condenser, a temperature gauge, a dropping funnel, a septum cap made of silicon, and a stirrer. In a stream of nitrogen, the mixture was heated to 40° C. while being stirred. A Karstedt's catalyst (20 µl) was added to the mixture with a microsyringe to initiate the reaction. After the completion of heat generation had been confirmed, the mixture was heated to be brought into a reflux state. The mixture was subjected to a reaction for 3 hours, and then part of the reaction mixture was sampled and subjected to infrared absorption spectral analysis. The disappearance of a peak at 2138 cm$^{-1}$ originating from Si—H group was confirmed, and the time point of the disappearance was defined as the end point of the reaction. Then, the reaction mixture was concentrated under reduced pressure at 120° C. for 1 hour and at 130° C. for 1 hour, thereby 62 g of a viscous liquid were obtained. The resultant viscous liquid was dissolved in methyl acetate (250 ml), and then powdery active carbon (1.3 g) was added to the solution. After having been stirred at 40° C. for 1 hour, the mixture was filtered, thereby active carbon was removed. The resultant reaction mixture was concentrated under reduced pressure at 80° C., thereby a colorless, transparent, viscous liquid (61 g) was obtained. Next, the resultant viscous liquid was dissolved in ethyl acetate (40 ml), and the solution was reprecipitated from n-heptane (1,200 ml). The produced solid was filtered, and then the residue was dried under reduced pressure at 40° C. for 3 hours, thereby Compound (1-5-1) as a white solid (55 g) was obtained.

$^1$H NMR (CDCl$_3$): δ(ppm); 0.04 (s, 24H), 0.48-0.52 (m, 8H), 1.46-1.53 (m, 8H), 2.46 (dd, 4H), 2.67 (t, 4H), 2.96-3.00 (m, 4H), 3.09-3.17 (m, 12H), 3.4 5 (dd, 4H), 7.18 (t, 8H), 7.25 (t, 8H), 7.33 (t, 4H), 7.39 (t, 4H), 7.43 (d, 8H), 7.57 (d, 8H).

$^{29}$Si NMR (CDCl$_3$): δ(ppm); −106.95, −79.38, −79.12, 11.45

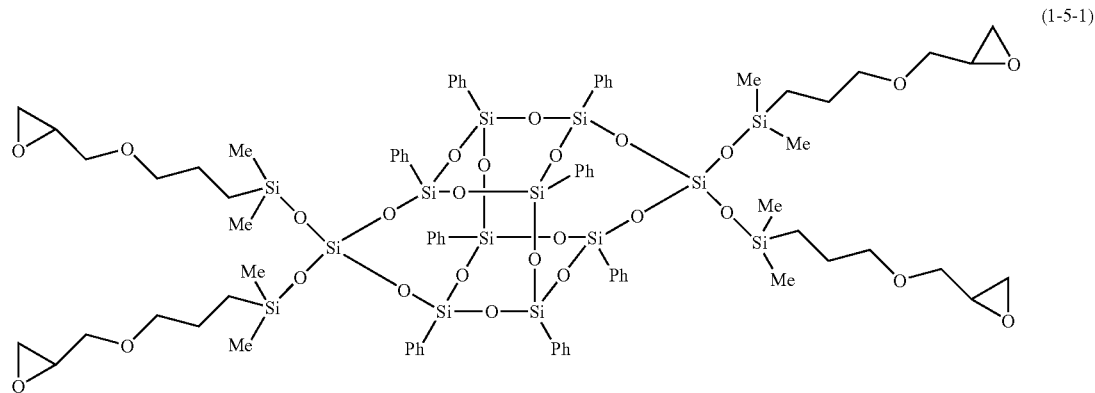

(1-5-1)

Example 4

<Synthesis of Compound (1-6-1)>

1.0 g (0.7 mmol) of Compound (1-4-1) produced in Example 2, 0.4 g (3.2 mmol) of 4-vinyl-1-cyclohexene-1,2-epoxide, and toluene (1.0 g) were loaded into a 50-ml four-necked flask equipped with a reflux condenser, a temperature gauge, a dropping funnel, a septum cap made of silicon, and a stirrer. In a stream of nitrogen, the mixture was heated to 60° C. while being stirred. A Karstedt's catalyst (0.9 μl) was added to the mixture with a microsyringe to initiate the reaction. After the completion of heat generation had been confirmed, the mixture was heated to be brought into a reflux state. The mixture was subjected to a reaction for 2 hours, and then part of the reaction mixture was sampled and subjected to infrared absorption spectral analysis. The disappearance of a peak at 2137 cm$^{-1}$ originating from Si—H group was confirmed, and the time point of the disappearance was defined as the end point of the reaction. Then, the reaction mixture was concentrated under reduced pressure at 80° C. for 2 hours, thereby a yellow solid (1.4 g) was obtained. The resultant yellow solid was dissolved in ethyl acetate (1.4 g) After that, the solution was dropped to normal hexane (28 g), followed by stirring. Then, the mixture was filtered with a membrane filter having pore size of 0.1 μm, and the filtrate was concentrated under reduced pressure at 80° C. for 2 hours, thereby Compound (1-6-1) as a white solid (1.3 g) was obtained.

$^1$H-NMR (CDCl$_3$): δ(ppm); 0.01 (s, 24H), 0.40-0.44 (m, 8H), 0.52-0.63 (m, 2H), 0.82-0.87 (m, 4H), 0.95-1.26 (m, 18H), 1.43-1.49 (m, 2H), 1.59-1.78 (m, 6H), 1.94 (dd, 4H), 2.91-3.01 (m, 8H), 7.17 (t, 8H), 7.25 (t, 8H), 7.33 (t, 4H), 7.38-7.43 (m, 12H), 7.56 (d, 8H).

$^{29}$Si-NMR (CDCl$_3$): δ(ppm); −106.92, −79.41, −79.18, 11.26, 11.28, 11.34, 11.36.

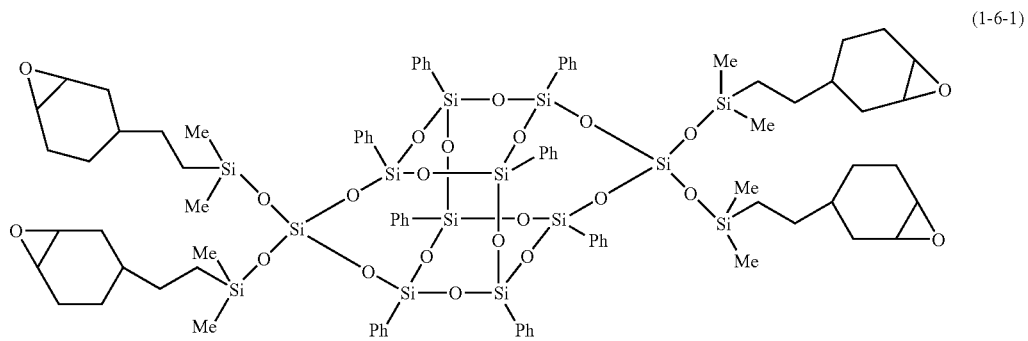

(1-6-1)

Example 5

<Synthesis of Compound (1-3-2)>

6.4 g (6.0 mmol) of Compound (3-2) obtained in Synthesis Example 2, 2.2 g (8.3 mmol) of tetraacetoxysilane, and ethyl acetate (120 ml) were loaded into a reaction vessel equipped with a reflux condenser, a temperature gauge, and a stirring device. In a stream of nitrogen, the mixture was heated to 75° C. while being stirred, and was then subjected to the reaction for 4 hours. After the mixture had been cooled to room temperature, 1.1 g (4.2 mmol) of tetraacetoxysilane were added to the mixture, followed by heating to 75° C. to perform the reaction for 1 hour. Then, the resultant was cooled to room temperature. After that, water was added to the resultant, and the mixture was centrifuged to be separated into a solid and a liquid. Toluene (40 ml) was added to the resultant solution, and the mixture was centrifuged again to be separated into a solid and a liquid; the operation was repeated 3 times. A filtrate thus obtained was concentrated under reduced pressure, thereby Compound (1-3-2) as a white solid was obtained.

$^1$H-NMR δ(ppm); 6.17 (s, 4H). 6.83-7.69 (m, 80H).

$^{29}$Si-NMR δ(ppm); −108.91, −89.70, −89.66, −78.84, −78.51, −77.67.

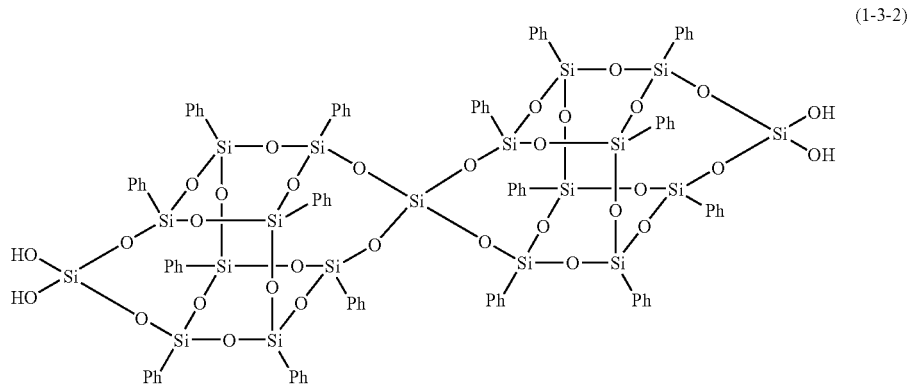

(1-3-2)

Example 6

<Synthesis of Compound (2-1-1)>

1 g (0.9 mmol) of Compound (3-2) obtained in Synthesis Example 2, 0.8 g (3.0 mmol) of tetraacetoxysilane, and ethyl acetate (40 ml) were loaded into a reaction vessel equipped with a reflux condenser, a temperature gauge, and a stirring device. In a stream of nitrogen, the mixture was heated to 55° C. while being stirred, and was then subjected to a reaction for 5 hours. Then, the mixture was cooled to room temperature. After that, 6.4 g (6.0 mmol) of Compound (3-2) were dissolved in tetrahydrofuran (20 ml), and the obtained solution was added to the mixture, followed by heating to 55° C. to perform the reaction for 6 hours. Then, the resultant was cooled to room temperature. After that, it was neutralized, washed with water, filtered, and concentrated, thereby a white solid (7.8 g) was obtained. Next, ethyl acetate (30 ml) was added to the resultant white solid, followed by stirring. After that, the mixture was separated into a solid and a liquid. Then, toluene (40 ml) was added to the resultant filtrate, and the produced solid was separated by filtration. Then, hexane was added to the filtrate for recrystallization, thereby Compound (2-1-1) as a white solid was obtained.

$^{29}$Si-NMR δ(ppm); −109.10, −78.99, −78.58, −77.81, −77.68, −69.02.

The invention claimed is:

1. A polysiloxane represented by the formula (1):

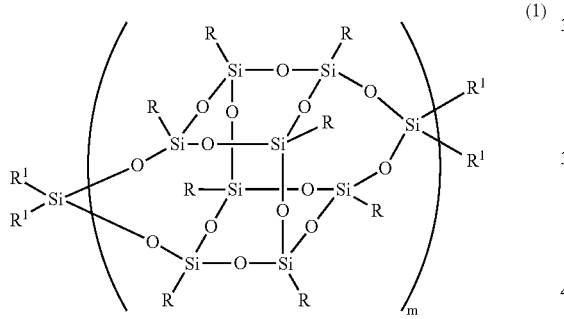

(1)

where in the formula (1):

R independently represents alkyl having 1 to 45 carbon atoms whereby optional hydrogen may be replaced by fluorine and optional —CH$_2$— may be replaced by —O—, —CH=CH—, or cycloalkylene;

cycloalkyl having 4 to 8 carbon atoms;

substituted or unsubstituted aryl whereby optional hydrogen on aryl may be replaced by halogen or alkyl having 1 to 10 carbon atoms in which optional hydrogen may be replaced by fluorine and optional —CH$_2$— may be replaced by —O—, —CH=CH—, or phenylene; or substituted or unsubstituted arylalkyl whereby optional hydrogen on aryl may be replaced by halogen or alkyl having 1 to 10 carbon atoms in which optional hydrogen may be replaced by fluorine, and optional —CH$_2$— may be replaced by —O—, —CH=CH—, or phenylene, and alkylene of the arylalkyl has 1 to 10 carbon atoms whereby optional hydrogen may be replaced by fluorine and optional —CH$_2$— may be replaced by —O—, —CH=CH—, or phenylene;

m and n independently represent an integer of 1 to 1,000;

wherein when m=1, R$^1$ is independently selected from the group consisting of alkoxy, acetoxy, and —OSi(A)$_3$, and when 2≦m≦1,000, R1 is independently selected from the group consisting of hydrogen, hydroxyl, halogen, alkoxy, acetoxy, —OSi(A)$_3$, and a group defined in the same manner as R;

in —OSi(A)$_3$, A independently represents hydrogen;

alkyl having 1 to 10 carbon atoms whereby optional hydrogen may be replaced by hydroxyl, halogen, carboxyl, ester, 2,4-dioxo-3-oxacyclopentyl, acetoxy, amino group, isocyanate, oxiranyl, 3,4-epoxycyclohexyl, oxetanyl, cyano, vinyl, (meth)acryloyl, 4-vinylphenyl, alkyleneoxy, or mercapto, and optional —CH$_2$— may be replaced by —O—, —CH=CH— or phenylene; or phenyl.

2. A polysiloxane represented by the formula (1-0):

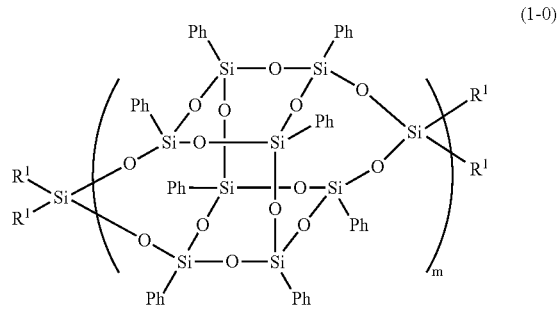

(1-0)

where in the formula (1-0):

m represents an integer of 1 to 1,000;

when m=1, R$^1$ is independently selected from the group consisting of alkoxy, acetoxy, and —OSi(A)$_3$, and when 2≦m≦1,000, R$^1$ is independently selected from the group consisting of hydrogen, hydroxyl, halogen, alkoxy, acetoxy, —OSi(A)$_3$, alkyl having 1 to 10 carbon atoms, and phenyl;

in —OSi(A)$_3$, A independently represents hydrogen;

alkyl having 1 to 10 carbon atoms whereby optional hydrogen may be replaced by hydroxyl, halogen, carboxyl, ester, 2,4-dioxo-3-oxacyclopentyl, acetoxy, amino group, isocyanate, oxiranyl, 3,4-epoxycyclohexyl, oxetanyl, cyano, vinyl, (meth)acryloyl, 4-vinylphenyl, alkyleneoxy, or mercapto, and optional —CH$_2$— may be replaced by —O—, —CH=CH— or phenylene; or phenyl.

3. A polysiloxane represented by the formula (1-1):

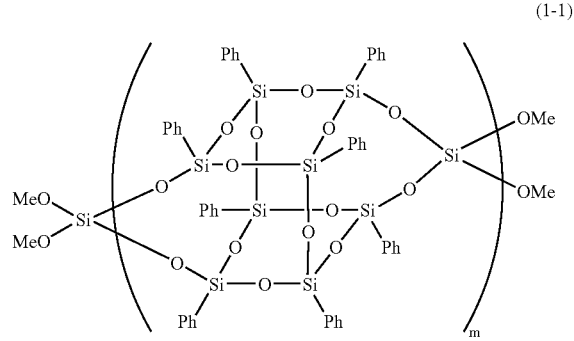

(1-1)

where in the formula (1-1), m represents an integer of 1 to 1,000.

4. A polysiloxane represented by the formula (1-2):

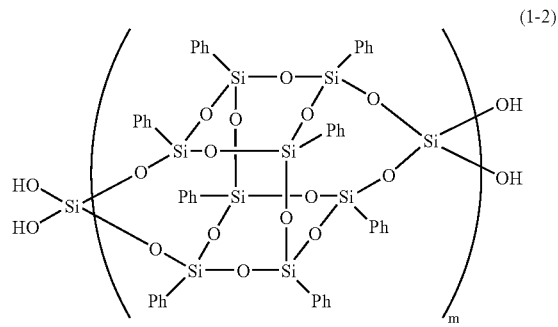

(1-2)

where in the formula (1-2), m represents an integer of 2 to 1,000.

5. A polysiloxane represented by the formula (1-3):

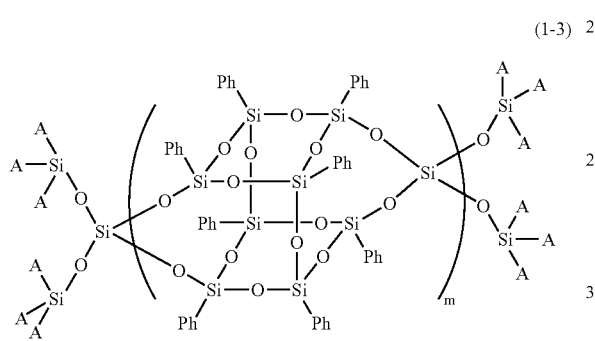

(1-3)

where in the formula (1-3), A independently represents hydrogen;

alkyl having 1 to 10 carbon atoms whereby optional hydrogen may be replaced by hydroxyl, halogen, carboxyl, ester, 2,4-dioxo-3-oxacyclopentyl, acetoxy, amino group, isocyanate, oxiranyl, 3,4-epoxycyclohexyl, an oxetanyl, cyano, vinyl, (meth)acryloyl, 4-vinylphenyl, alkyleneoxy, or mercapto, and optional —CH$_2$— may be replaced by —O—, —CH=CH— or phenylene; or phenyl; and m represents an integer of 1 to 1,000.

6. A polysiloxane represented by the formula (1-4):

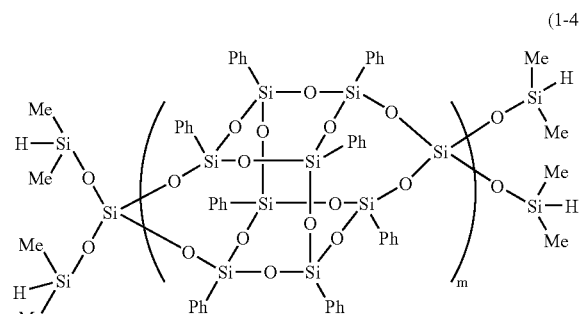

(1-4)

where in the formula (1-4), m represents an integer of 1 to 1,000.

7. A polysiloxane represented by the formula (1-5):

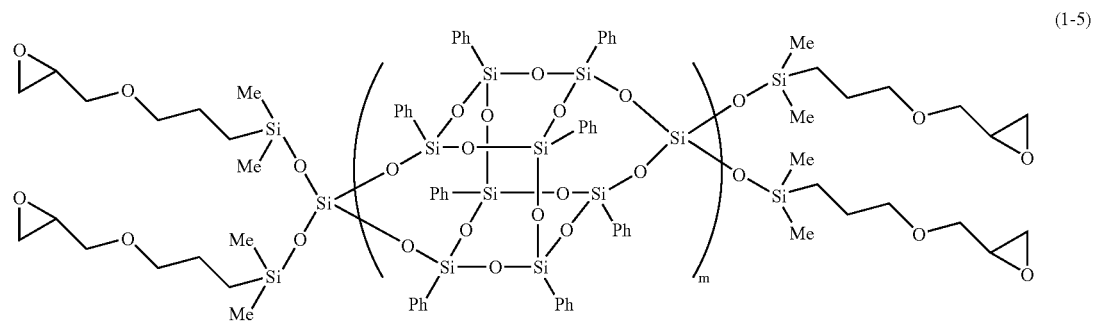

(1-5)

where in the formula (1-5), m represents an integer of 2 to 1,000.

8. A polysiloxane represented by the formula (1-6):

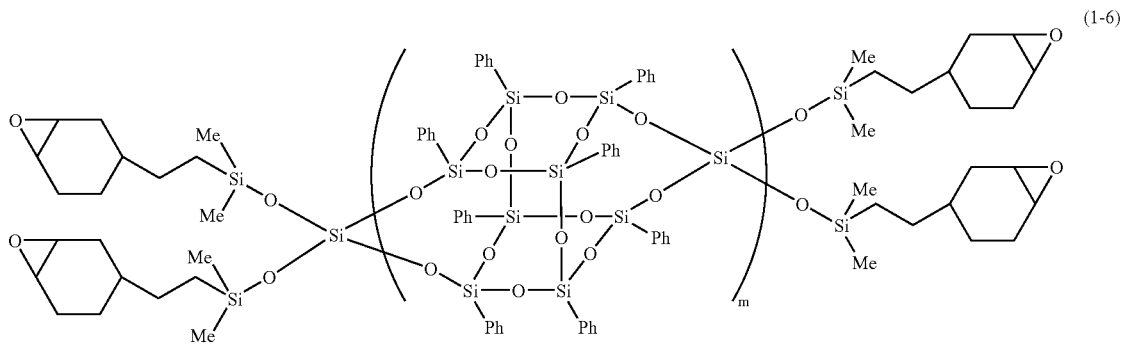

(1-6)

where in the formula (1-6), m represents an integer of 1 to 1,000.

9. A method of producing a polysiloxane represented by the formula (1-a), comprising reacting a compound represented by the formula (1-0-1) with a compound represented by the formula (1-0-2):

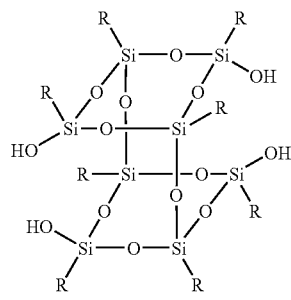
(1-0-1)

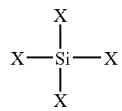
(1-0-2)

where in the formula (1-0-1),
R independently represents
alkyl having 1 to 45 carbon atoms whereby optional hydrogen may be replaced by fluorine, and optional —CH$_2$— may be replaced by —O— or —CH=CH—;
cycloalkyl having 4 to 8 carbon atoms;
substituted or unsubstituted aryl whereby optional hydrogen on aryl may be replaced by halogen or alkyl having 1 to 10 carbon atoms in which optional hydrogen may be replaced by fluorine, and optional —CH$_2$— may be replaced by —O— or —CH=CH—; or
substituted or unsubstituted arylalkyl whereby optional hydrogen on aryl may be replaced by halogen or alkyl having 1 to 10 carbon atoms in which optional hydrogen may be replaced by fluorine, and optional —CH$_2$— may be replaced by —O— or —CH=CH—, and alkylene of the arylalkyl has 1 to 10 carbon atoms, and optional —CH$_2$— in the alkylene may be replaced by —O—; and
in the formula (1-0-2),
X represents a group capable of reacting with silanol;

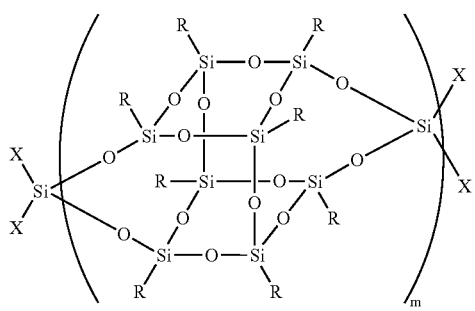
(1-a)

where in the formula (1-a),
R represents a group defined in the same manner as R in the formula (1-0-1);
X represent a group defined in the same manner as X in the formula (1-0-2); and
m and n represent an integer of 1 to 1,000.

10. A method of producing a polysiloxane represented by the formula (1-a'), comprising reacting a compound represented by the formula (1-0-1') with a compound represented by the formula (1-0-2'):

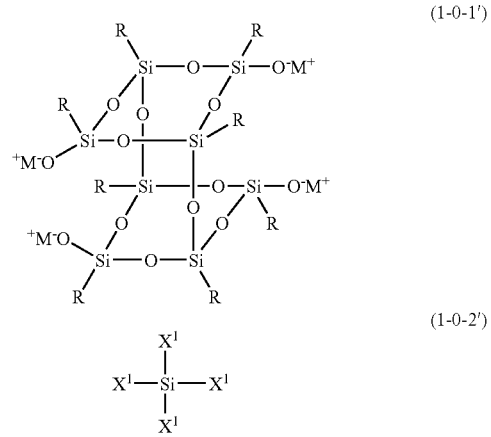
(1-0-1')

(1-0-2')

where in the formula (1-0-1') and (1-0-2')
M is alkali metal, and R independently represents
alkyl having 1 to 45 carbon atoms whereby optional hydrogen may be replaced by fluorine, and optional —CH$_2$— may be replaced by —O— or —CH=CH—;
cycloalkyl having 4 to 8 carbon atoms;
substituted or unsubstituted aryl whereby optional hydrogen on aryl may be replaced by halogen or alkyl having 1 to 10 carbon atoms in which optional hydrogen may be replaced by fluorine, and optional —CH$_2$— may be replaced by —O— or —CH=CH—; or
substituted or unsubstituted arylalkyl whereby optional hydrogen on aryl may be replaced by halogen or alkyl having 1 to 10 carbon atoms in which optional hydrogen may be replaced by fluorine, and optional —CH$_2$— may be replaced by —O— or —CH=CH—, and alkylene of the arylalkyl has 1 to 10 carbon atoms, and optional —CH$_2$— in the alkylene may be replaced by —O—; and
X$^1$ represents halogen;

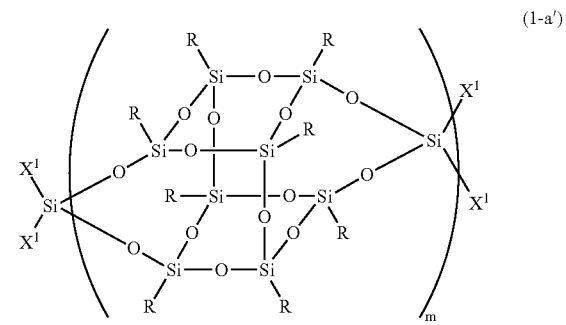
(1-a')

where in the formula (1-a'),
R represents a group defined in the same manner as R in the formula (1-0-1');
X$^1$ represents a group defined in the same manner as X$^1$ in the formula (1-0-2'); and
m and n represent an integer of 1 to 1,000.

11. A method of producing a compound represented by the formula (1-b), comprising producing a compound represented by the formula (1-a) by the method according to claim 9, and hydrolyzing the resultant compound represented by the formula (1-a):

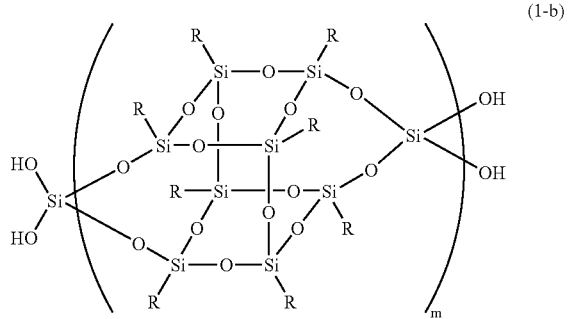

where in the formula (1-b),
R represents a group defined in the same manner as in the formula (1-a); and
m represents an integer of 2 to 1,000.

12. A method of producing a compound represented by the formula (1-b), comprising producing a compound represented by the formula (1-a') by the method according to claim 10, and hydrolyzing the compound represented by the formula (1-a'):

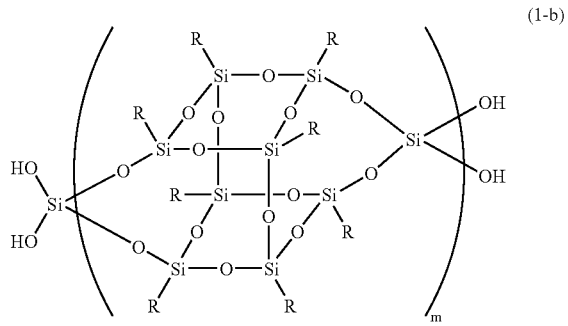

where in the formula (1-b),
R represents a group defined in the same manner as R in the formula (1-a'); and
m represents an integer of 2 to 1,000.

13. A method of producing a compound represented by the formula (1-c), comprising producing a compound represented by the formula (1-b) by the method according to claim 11 or 12, and reacting the compound represented by the formula (1-b) with a compound represented by the formula (1-0-3):

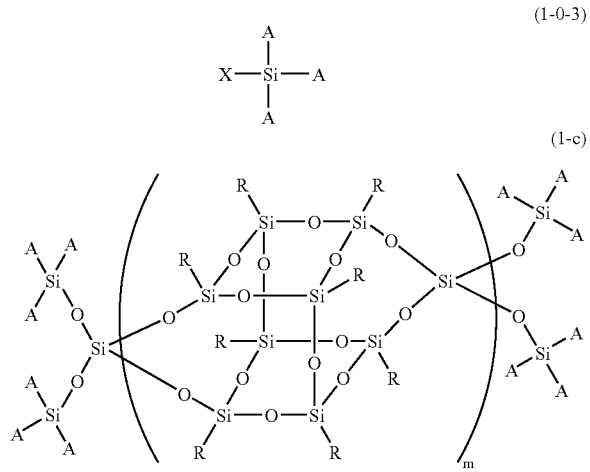

where in the formula (1-0-3) and (1-c),
R represents a group defined in the same manner as R in the formula (1-b);
m represents an integer of 1 to 1,000;
X represents a group capable of reacting with silanol;
A independently represents
hydrogen;
alkyl having 1 to 10 carbon atoms whereby optional hydrogen may be replaced by hydroxyl, halogen, carboxyl, ester, 2,4-dioxo-3-oxa-cyclopentyl, acetoxy, amino group, isocyanate, oxiranyl, 3,4-epoxycyclohexyl, oxetanyl, cyano, vinyl, (meth)acryloyl, 4-vinylphenyl, alkyleneoxy, or mercapto, and optional —CH$_2$— may be replaced by —O—, —CH=CH— or phenylene; or
phenyl.

14. A method of producing a compound represented by the formula (1-c), comprising producing a compound represented by the formula (1-a) by the method according to claim 9, and reacting the compound represented by the formula (1-a) with a compound represented by the formula (1-0-4):

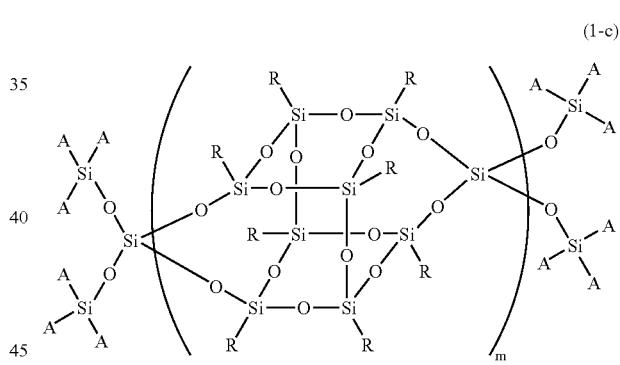

where in the formula (1-0-4) and (1-c),
R represents a group defined in the same manner as R in the formula (1-a);
m represents an integer of 1 to 1,000;
A independently represents
hydrogen;
alkyl having 1 to 10 carbon atoms whereby optional hydrogen may be replaced by hydroxyl, halogen, carboxyl, ester, 2,4-dioxo-3-oxa-cyclopentyl, acetoxy , amino group, isocyanate, oxiranyl, 3,4-epoxycyclohexyl, oxetanyl, cyano, vinyl, (meth)acryloyl, 4-vinylphenyl, alkyleneoxy, or mercapto, and optional —CH$_2$— may be replaced by —O—, —CH=CH— or phenylene; or
phenyl.

15. A method of producing a compound represented by the formula (1-c), comprising producing a compound represented by the formula (1-a') by the method according to claim

10, and reacting the compound represented by the formula (1-a') with a compound represented by the formula (1-0-4):

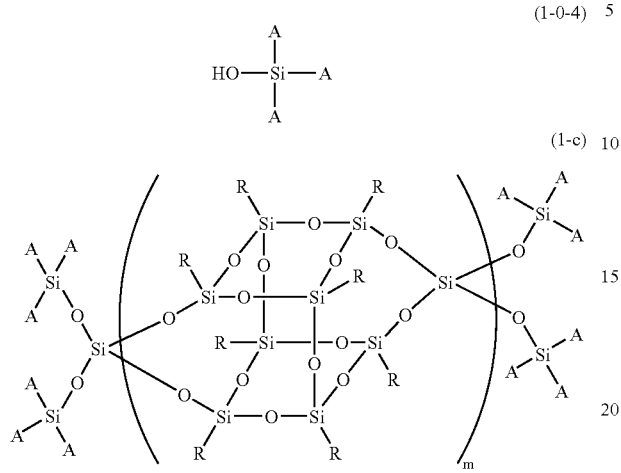

where in the formula (1-0-4) and (1-c),
R represents a group defined in the same manner as R in the formula (1-a');
m represents an integer of 1 to 1,000;
A independently represents
hydrogen;
alkyl having 1 to 10 carbon atoms whereby optional hydrogen may be replaced by hydroxyl, halogen, carboxyl, ester, 2,4-dioxo-3-oxa-cyclopentyl, acetoxy, amino group, isocyanate, oxiranyl, 3,4-epoxycyclohexyl, oxetanyl, cyano, vinyl, (meth)acryloyl, 4-vinylphenyl, alkyleneoxy, or mercapto, and optional —$CH_2$— may be replaced by —O—, —CH=CH— or phenylene; or phenyl.

16. A method of producing a compound represented by the formula (1-d), comprising producing a compound represented by the formula (1-c) in which at least one of A's represents hydrogen, and remaining of A's represent alkyl having 1 to 10 carbon atoms, phenyl, or phenylalkyl by the method according to claim 13, and reacting the resultant compound with a compound represented by the formula (1-0-5):

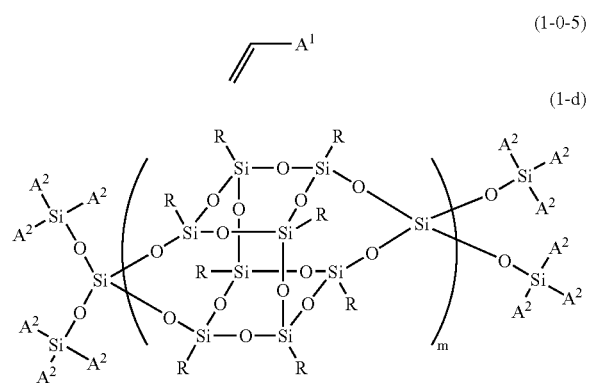

where in the formula (1-0-5) and (1-d),
$A^1$ represents alkyl having 1 to 8 carbon atoms whereby optional hydrogen may be replaced by hydroxyl, halogen, carboxyl, ester, 2,4-dioxo-3-oxa-cyclopentyl, acetoxy, amino group, isocyanate, oxiranyl, 3,4-epoxycyclohexyl, oxetanyl, cyano, vinyl, (meth)acryloyl, 4-vinylphenyl, alkyleneoxy, or mercapto, and optional —$CH_2$— may be replaced by —O—, —CH=CH— or phenylene;
R represents a group defined in the same manner as R in the formula (1-c); and
at least one of $A^2$'s represents —$CH_2CH_2A^1$, and remaining of $A^2$'s are independently selected from the group consisting of alkyl having 1 to 10 carbon atoms, phenyl, and phenylalkyl.

17. A method of producing a compound represented by the formula (1-d), comprising producing a compound represented by the formula (1-c) in which at least one of A's represents hydrogen, and remaining of A's represent alkyl having 1 to 10 carbon atoms, phenyl, or phenylalkyl by the method according to claim 14, and reacting the resultant compound with a compound represented by the formula (1-0-5):

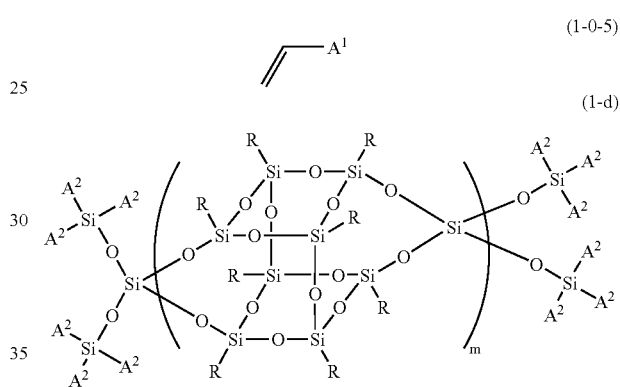

where in the formula (1-0-5) and (1-d),
$A^1$ represents alkyl having 1 to 8 carbon atoms whereby optional hydrogen may be replaced by hydroxyl, halogen, carboxyl, ester, 2,4-dioxo-3-oxa-cyclopentyl, acetoxy, amino group, isocyanate, oxiranyl, 3,4-epoxycyclohexyl, oxetanyl, cyano, vinyl, (meth)acryloyl, 4-vinylphenyl, alkyleneoxy, or mercapto, and optional —$CH_2$— may be replaced by —O—, —CH=CH— or phenylene;
R represents a group defined in the same manner as R in the formula (1-c); and
at least one of $A^2$'s represents —$CH_2CH_2A^1$, and remaining of $A^2$'s are independently selected from the group consisting of alkyl having 1 to 10 carbon atoms, phenyl, and phenylalkyl.

18. A method of producing a compound represented by the formula (1-d), comprising producing a compound represented by the formula (1-c) in which at least one of A's represents hydrogen, and remaining of A's represent alkyl having 1 to 10 carbon atoms, phenyl, or phenylalkyl by the method according to claim 15, and reacting the resultant compound with a compound represented by the formula (1-0-5):

-continued

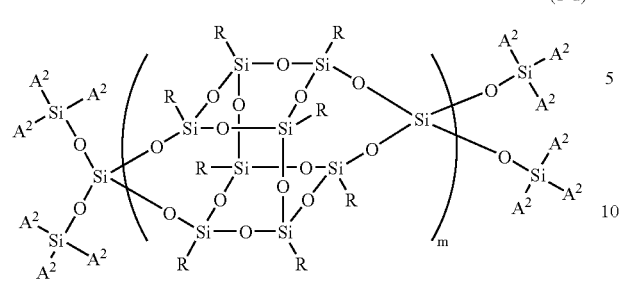
(1-d)

where in the formula (1-0-5) and (1-d), $A^1$ represents alkyl having 1 to 8 carbon atoms whereby optional hydrogen may be replaced by hydroxyl, halogen, carboxyl, ester, 2,4-dioxo-3-oxa-cyclopentyl, acetoxy, amino group, isocyanate, oxiranyl, 3,4-epoxycyclohexyl, oxetanyl, cyano, vinyl, (meth)acryloyl, 4-vinylphenyl, alkyleneoxy, or mercapto, and optional —$CH_2$— may be replaced by —O—, —CH=CH—, or phenylene;

R represents a group defined in the same manner as R in the formula (1-c); and at least one of $A^2$'s represents —$CH_2CH_2A^1$, and remaining of $A^2$'s are independently selected from the group consisting of alkyl having 1 to 10 carbon atoms, phenyl, and phenylalkyl.

* * * * *